(12) United States Patent
McCormack et al.

(10) Patent No.: US 7,270,723 B2
(45) Date of Patent: *Sep. 18, 2007

(54) MICROPOROUS BREATHABLE ELASTIC FILM LAMINATES, METHODS OF MAKING SAME, AND LIMITED USE OR DISPOSABLE PRODUCT APPLICATIONS

(75) Inventors: Ann Louise McCormack, Cumming, GA (US); Susan Elaine Shawver, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/918,553

(22) Filed: Aug. 13, 2004

(65) Prior Publication Data

US 2005/0101206 A1 May 12, 2005

Related U.S. Application Data

(60) Provisional application No. 60/518,100, filed on Nov. 7, 2003.

(51) Int. Cl.
*B32B 37/00* (2006.01)
(52) U.S. Cl. .............. 156/229; 156/244.11; 428/317.9; 428/323; 428/50; 428/910; 524/425
(58) Field of Classification Search ............ None
See application file for complete search history.

(56) References Cited

U.S. PATENT DOCUMENTS 3,046,172 A 7/1962 Reid

| 3,233,029 A | 2/1966 | Rasmussen |
| 3,276,944 A | 10/1966 | Levy |
| 3,338,992 A | 8/1967 | Kinney |
| 3,341,394 A | 9/1967 | Kinney |
| 3,383,449 A | 5/1968 | Muller |
| 3,502,538 A | 3/1970 | Petersen |
| 3,502,763 A | 3/1970 | Hartmann |

(Continued)

FOREIGN PATENT DOCUMENTS

CA 803714 1/1969

(Continued)

OTHER PUBLICATIONS

*Encyclopedia of Polymer Science and Engineering*, Wiley & Sons, vol. 10, 1987, pp. 211-212.

(Continued)

*Primary Examiner*—Melvin Mayes
*Assistant Examiner*—Kim McClelland
(74) *Attorney, Agent, or Firm*—Richard M. Shane; James Arnold; Steven D. Flack

(57) ABSTRACT

A breathable, elastic film/support layer laminate includes a thermoplastic elastomer film sheet of a thermoplastic elastomer and a filled semi crystalline predominantly linear polymer. The film includes between about 25 and 70 weight percent filler, between about 5 and 30 by weight percent semi-crystalline linear polymer, and between about 15 and 60 by weight percent elastomeric polymer. The filler is closely associated with the semi-crystalline linear polymer. The film demonstrates a load loss value at a 50 percent elongation of less than 50 percent, and a breathability of greater than 100 g/m²/24 hours and is laminated to a nonwoven layer.

43 Claims, 7 Drawing Sheets

U.S. PATENT DOCUMENTS

| | | |
|---|---|---|
| 3,542,615 A | 11/1970 | Dobo et al. |
| 3,676,242 A | 7/1972 | Prentice |
| 3,692,618 A | 9/1972 | Dorschner et al. |
| 3,761,348 A | 9/1973 | Chamberlin |
| 3,802,817 A | 4/1974 | Matsuki et al. |
| 3,839,240 A | 10/1974 | Zimmerman |
| 3,844,865 A | 10/1974 | Elton et al. |
| 3,849,241 A | 11/1974 | Butin et al. |
| 3,849,526 A | 11/1974 | Muller et al. |
| 3,855,046 A | 12/1974 | Hansen et al. |
| 3,870,593 A | 3/1975 | Elton et al. |
| 3,880,966 A | 4/1975 | Zimmerman et al. |
| 3,988,883 A | 11/1976 | Sze |
| 4,039,364 A | 8/1977 | Rasmussen |
| 4,041,203 A | 8/1977 | Brock et al. |
| 4,100,324 A | 7/1978 | Anderson et al. |
| 4,106,313 A | 8/1978 | Boe |
| 4,116,892 A | 9/1978 | Schwarz |
| 4,124,673 A | 11/1978 | Pieper et al. |
| 4,136,218 A | 1/1979 | Nischwitz et al. |
| 4,138,459 A | 2/1979 | Brazinsky et al. |
| 4,144,008 A | 3/1979 | Schwarz |
| 4,153,664 A | 5/1979 | Sabee |
| 4,153,751 A | 5/1979 | Schwarz |
| 4,223,059 A | 9/1980 | Schwarz |
| 4,243,802 A | 1/1981 | Landoll |
| 4,251,585 A | 2/1981 | Schwarz |
| 4,265,960 A | 5/1981 | Arbit et al. |
| 4,285,100 A | 8/1981 | Schwarz |
| 4,289,832 A | 9/1981 | Schwarz |
| 4,301,102 A | 11/1981 | Fernstrom et al. |
| 4,336,638 A | 6/1982 | Mercer |
| 4,340,563 A | 7/1982 | Appel et al. |
| 4,350,655 A | 9/1982 | Hoge |
| 4,364,985 A | 12/1982 | Tokuyama et al. |
| 4,368,565 A | 1/1983 | Schwarz |
| 4,374,175 A | 2/1983 | Tanaka |
| 4,374,888 A | 2/1983 | Bornslaeger |
| 4,384,023 A | 5/1983 | Okamura et al. |
| 4,405,686 A | 9/1983 | Kuroda et al. |
| 4,422,892 A | 12/1983 | Plant |
| 4,424,257 A | 1/1984 | Bach |
| 4,438,167 A | 3/1984 | Schwarz |
| 4,443,513 A | 4/1984 | Meitner et al. |
| 4,464,815 A | 8/1984 | Canterino et al. |
| 4,472,328 A | 9/1984 | Sugimoto et al. |
| 4,475,971 A | 10/1984 | Canterino |
| 4,517,714 A | 5/1985 | Sneed et al. |
| 4,521,484 A | 6/1985 | Li |
| 4,522,203 A | 6/1985 | Mays |
| 4,533,510 A | 8/1985 | Nissel |
| 4,563,229 A | 1/1986 | Sorez |
| 4,590,124 A | 5/1986 | Schoenberg |
| 4,613,643 A | 9/1986 | Nakamura et al. |
| 4,629,525 A | 12/1986 | Rasmussen |
| 4,663,220 A | 5/1987 | Wisneski et al. |
| 4,698,372 A | 10/1987 | Moss |
| 4,701,432 A | 10/1987 | Welborn, Jr. |
| 4,720,415 A | 1/1988 | Vander Wielen et al. |
| 4,734,324 A | 3/1988 | Hill |
| 4,758,239 A | 7/1988 | Yeo et al. |
| 4,777,073 A | 10/1988 | Sheth |
| 4,789,699 A | 12/1988 | Kieffer et al. |
| 4,793,885 A | 12/1988 | Rasmussen |
| 4,795,668 A | 1/1989 | Krueger et al. |
| 4,806,300 A | 2/1989 | Walton et al. |
| 4,816,094 A | 3/1989 | Pomplun et al. |
| 4,818,464 A | 4/1989 | Lau |
| 4,820,590 A | 4/1989 | Hodgson, Jr. et al. |
| 4,833,172 A | 5/1989 | Schwarz et al. |
| 4,854,995 A | 8/1989 | Kasper et al. |
| 4,861,660 A | 8/1989 | Ishii |
| 4,863,785 A | 9/1989 | Berman et al. |
| 4,867,881 A | 9/1989 | Kinzer |
| 4,877,679 A | 10/1989 | Leatherman et al. |
| 4,923,650 A | 5/1990 | Antoon, Jr. et al. |
| 4,965,122 A | 10/1990 | Morman |
| 4,972,522 A | 11/1990 | Rautenberg |
| 4,981,747 A | 1/1991 | Morman |
| 4,992,124 A | 2/1991 | Kurihara et al. |
| 4,994,335 A | 2/1991 | Kamaei et al. |
| 5,011,698 A | 4/1991 | Antoon, Jr. et al. |
| 5,028,289 A | 7/1991 | Rasmussen |
| 5,057,368 A | 10/1991 | Largman et al. |
| 5,064,802 A | 11/1991 | Stevens et al. |
| 5,069,970 A | 12/1991 | Largman et al. |
| 5,073,316 A | 12/1991 | Bizen et al. |
| 5,108,820 A | 4/1992 | Kaneko et al. |
| 5,108,827 A | 4/1992 | Gessner |
| 5,116,662 A | 5/1992 | Morman |
| 5,117,540 A | 6/1992 | Walton et al. |
| 5,120,594 A | 6/1992 | Mrozinski |
| 5,143,679 A | 9/1992 | Weber et al. |
| 5,145,727 A | 9/1992 | Potts et al. |
| 5,153,254 A | 10/1992 | Chen |
| 5,156,793 A | 10/1992 | Buell et al. |
| 5,164,258 A | 11/1992 | Shida et al. |
| 5,167,897 A | 12/1992 | Weber et al. |
| 5,169,706 A | 12/1992 | Collier, IV et al. |
| 5,169,712 A | 12/1992 | Tapp |
| 5,176,953 A | 1/1993 | Jacoby et al. |
| 5,178,931 A | 1/1993 | Perkins et al. |
| 5,188,885 A | 2/1993 | Timmons et al. |
| 5,204,429 A | 4/1993 | Kaminsky et al. |
| 5,226,992 A | 7/1993 | Morman |
| 5,238,623 A | 8/1993 | Mrozinski |
| 5,256,231 A | 10/1993 | Gorman et al. |
| 5,256,417 A | 10/1993 | Koltisko |
| 5,271,883 A | 12/1993 | Timmons et al. |
| 5,277,976 A | 1/1994 | Hogle et al. |
| 5,288,791 A | 2/1994 | Collier, IV et al. |
| 5,294,482 A | 3/1994 | Gessner |
| 5,296,184 A | 3/1994 | Wu et al. |
| 5,304,599 A | 4/1994 | Himes |
| 5,332,613 A | 7/1994 | Taylor et al. |
| 5,336,545 A | 8/1994 | Morman |
| 5,336,552 A | 8/1994 | Strack et al. |
| 5,352,518 A | 10/1994 | Muramoto et al. |
| 5,354,591 A | 10/1994 | Ott et al. |
| 5,370,940 A | 12/1994 | Hazlitt et al. |
| 5,374,696 A | 12/1994 | Rosen et al. |
| 5,376,430 A | 12/1994 | Swenson et al. |
| 5,380,313 A | 1/1995 | Goulait et al. |
| 5,380,578 A | 1/1995 | Rautenberg |
| 5,382,400 A | 1/1995 | Pike et al. |
| 5,393,599 A | 2/1995 | Quantrille et al. |
| 5,395,810 A | 3/1995 | Shamshoum et al. |
| 5,405,887 A | 4/1995 | Morita et al. |
| 5,411,636 A | 5/1995 | Hermans et al. |
| 5,418,045 A | 5/1995 | Pike et al. |
| 5,424,025 A | 6/1995 | Hanschen et al. |
| 5,425,987 A | 6/1995 | Shawver et al. |
| 5,429,856 A | 7/1995 | Krueger et al. |
| 5,451,450 A | 9/1995 | Erderly et al. |
| 5,455,992 A | 10/1995 | Kurschatke et al. |
| 5,456,982 A | 10/1995 | Hansen et al. |
| 5,466,410 A | 11/1995 | Hills |
| 5,468,702 A | 11/1995 | Jejelowo |
| 5,472,775 A | 12/1995 | Obijeski et al. |
| 5,489,469 A | 2/1996 | Kobayashi et al. |
| 5,492,598 A | 2/1996 | Hermans et al. |
| 5,498,468 A | 3/1996 | Blaney |
| 5,501,679 A | 3/1996 | Krueger et al. |
| RE35,206 E | 4/1996 | Hassenboehler, Jr. et al. |

| | | |
|---|---|---|
| 5,514,470 A | 5/1996 | Haffner et al. |
| 5,514,634 A | 5/1996 | Hagerty et al. |
| 5,518,801 A | 5/1996 | Chappell et al. |
| 5,527,752 A | 6/1996 | Reichle et al. |
| H1558 H | 7/1996 | Goulait et al. |
| 5,539,124 A | 7/1996 | Etherton et al. |
| 5,540,976 A | 7/1996 | Shawver et al. |
| 5,540,992 A | 7/1996 | Marcher et al. |
| 5,554,775 A | 9/1996 | Krishnamurti et al. |
| 5,576,374 A | 11/1996 | Betso et al. |
| 5,599,420 A | 2/1997 | Yeo et al. |
| 5,604,036 A | 2/1997 | Price et al. |
| 5,614,281 A | 3/1997 | Jackson et al. |
| 5,624,427 A | 4/1997 | Bergman et al. |
| 5,628,097 A | 5/1997 | Benson et al. |
| 5,643,846 A | 7/1997 | Reddy et al. |
| 5,648,428 A | 7/1997 | Reddy et al. |
| 5,650,225 A | 7/1997 | Dutta et al. |
| 5,651,853 A | 7/1997 | Wrigley et al. |
| 5,656,232 A | 8/1997 | Takai et al. |
| 5,661,096 A | 8/1997 | Winter et al. |
| 5,665,083 A | 9/1997 | Igaue et al. |
| 5,681,302 A | 10/1997 | Melbye et al. |
| 5,690,627 A | 11/1997 | Clear et al. |
| 5,691,034 A | 11/1997 | Krueger et al. |
| 5,695,376 A | 12/1997 | Datta et al. |
| 5,695,377 A | 12/1997 | Triebes et al. |
| 5,695,868 A | 12/1997 | McCormack |
| 5,707,468 A | 1/1998 | Arnold et al. |
| 5,723,087 A | 3/1998 | Chappell et al. |
| 5,723,546 A | 3/1998 | Sustic |
| 5,733,628 A | 3/1998 | Pelkie |
| 5,735,840 A | 4/1998 | Kline et al. |
| 5,743,999 A | 4/1998 | Kamps et al. |
| 5,747,405 A | 5/1998 | Little et al. |
| 5,755,902 A | 5/1998 | Reynolds |
| 5,756,580 A | 5/1998 | Natori et al. |
| 5,758,842 A | 6/1998 | Dorfel et al. |
| 5,759,926 A | 6/1998 | Pike et al. |
| 5,763,334 A | 6/1998 | Gupta et al. |
| 5,770,531 A | 6/1998 | Sudduth et al. |
| 5,789,065 A | 8/1998 | Haffner et al. |
| 5,804,524 A | 9/1998 | Reddy et al. |
| 5,814,390 A | 9/1998 | Stokes et al. |
| 5,814,567 A | 9/1998 | Yahiaoui et al. |
| 5,846,365 A | 12/1998 | Kline et al. |
| 5,853,635 A | 12/1998 | Morell et al. |
| 5,853,638 A | 12/1998 | Han |
| 5,883,028 A | 3/1999 | Morman et al. |
| 5,885,908 A | 3/1999 | Jaeger et al. |
| 5,888,607 A | 3/1999 | Seth et al. |
| 5,900,306 A | 5/1999 | Stopper |
| 5,910,136 A | 6/1999 | Hetzler et al. |
| 5,914,084 A | 6/1999 | Benson et al. |
| 5,928,211 A | 7/1999 | Gustafsson et al. |
| 5,928,212 A | 7/1999 | Kline et al. |
| 5,945,175 A | 8/1999 | Yahiaoui et al. |
| 5,957,907 A | 9/1999 | Sauer |
| 5,972,502 A | 10/1999 | Jessee et al. |
| 5,984,911 A | 11/1999 | Siebers et al. |
| 5,993,589 A | 11/1999 | Morman |
| 6,015,764 A | 1/2000 | McCormack et al. |
| 6,017,832 A | 1/2000 | Yahiaoui et al. |
| 6,028,016 A | 2/2000 | Yahiaoui et al. |
| 6,037,417 A | 3/2000 | Nguyen et al. |
| 6,045,900 A | 4/2000 | Haffner et al. |
| 6,054,002 A | 4/2000 | Griesbach, III et al. |
| 6,060,009 A | 5/2000 | Welygan et al. |
| 6,072,005 A | 6/2000 | Kobylivker et al. |
| 6,075,179 A | 6/2000 | McCormack et al. |
| 6,096,014 A | 8/2000 | Haffner et al. |
| 6,096,668 A | 8/2000 | Abuto et al. |
| 6,106,956 A | 8/2000 | Heyn et al. |
| 6,111,163 A | 8/2000 | McCormack et al. |
| 6,114,024 A | 9/2000 | Forte |
| 6,114,263 A | 9/2000 | Benson et al. |
| 6,120,899 A * | 9/2000 | Cameron et al. ........... 428/407 |
| 6,135,987 A | 10/2000 | Tsai et al. |
| 6,156,421 A | 12/2000 | Stopper et al. |
| 6,169,045 B1 | 1/2001 | Pike et al. |
| 6,172,177 B1 | 1/2001 | Wang et al. |
| 6,174,602 B1 | 1/2001 | Matsui et al. |
| 6,179,939 B1 | 1/2001 | Jones, Jr. et al. |
| 6,190,758 B1 | 2/2001 | Stopper |
| 6,203,654 B1 | 3/2001 | McFall et al. |
| 6,204,208 B1 | 3/2001 | Krzysik et al. |
| 6,214,274 B1 | 4/2001 | Melius et al. |
| 6,225,243 B1 | 5/2001 | Austin |
| 6,242,041 B1 | 6/2001 | Katoot et al. |
| 6,242,084 B1 | 6/2001 | Peet |
| 6,258,308 B1 * | 7/2001 | Brady et al. ............. 264/210.2 |
| 6,264,864 B1 | 7/2001 | Mackay |
| 6,265,045 B1 | 7/2001 | Mushaben |
| 6,268,062 B1 | 7/2001 | DeMeuse |
| 6,270,912 B1 | 8/2001 | Peet |
| 6,309,736 B1 | 10/2001 | McCormack et al. |
| 6,329,454 B1 | 12/2001 | Krabbenborg |
| 6,355,200 B1 | 3/2002 | Schmidt et al. |
| 6,383,431 B1 | 5/2002 | Dobrin et al. |
| 6,399,531 B1 | 6/2002 | Job et al. |
| 6,403,717 B1 | 6/2002 | Adams et al. |
| 6,409,711 B1 | 6/2002 | Jönbrink |
| 6,444,302 B1 | 9/2002 | Srinivas et al. |
| 6,461,457 B1 | 10/2002 | Taylor et al. |
| 6,475,591 B2 | 11/2002 | Mushaben |
| 6,479,154 B1 | 11/2002 | Walton et al. |
| 6,481,483 B1 | 11/2002 | Kobayashi et al. |
| 6,518,208 B2 | 2/2003 | Terakawa |
| 6,537,935 B1 | 3/2003 | Seth et al. |
| 6,586,354 B1 | 7/2003 | Topolkaraev et al. |
| 6,680,265 B1 | 1/2004 | Smith et al. |
| 6,706,228 B2 | 3/2004 | Mackay |
| 6,794,024 B1 | 9/2004 | Walton et al. |
| 6,881,375 B2 | 4/2005 | Topolkaraev et al. |
| 6,896,843 B2 | 5/2005 | Topolkaraev et al. |
| 6,969,378 B1 | 11/2005 | Vukos et al. |
| 2001/0041487 A1 | 11/2001 | Brady et al. |
| 2001/0042938 A1 | 11/2001 | Mackay |
| 2002/0004350 A1 | 1/2002 | Morman et al. |
| 2002/0006482 A1 | 1/2002 | Falla et al. |
| 2002/0088534 A1 | 7/2002 | Kobayashi et al. |
| 2002/0105110 A1 | 8/2002 | Dobrin et al. |
| 2002/0111598 A1 | 8/2002 | Vogt et al. |
| 2002/0117770 A1 | 8/2002 | Haynes et al. |
| 2002/0182426 A1 | 12/2002 | Tanaka et al. |
| 2003/0045844 A1 | 3/2003 | Taylor et al. |
| 2003/0050618 A1 | 3/2003 | Kondo et al. |
| 2003/0065297 A1 | 4/2003 | Davis et al. |
| 2003/0071391 A1 | 4/2003 | Brady et al. |
| 2003/0125696 A1 | 7/2003 | Morman et al. |
| 2004/0021251 A1 | 2/2004 | Wheat et al. |
| 2004/0087235 A1 | 5/2004 | Morman et al. |
| 2004/0091752 A1 | 5/2004 | Morman et al. |
| 2004/0110442 A1 | 6/2004 | Rhim et al. |
| 2004/0122408 A1 | 6/2004 | Potnis et al. |
| 2004/0127131 A1 | 7/2004 | Potnis |
| 2005/0042962 A1 | 2/2005 | McCormack et al. |
| 2005/0043460 A1 | 2/2005 | McCormack et al. |
| 2005/0133151 A1 | 6/2005 | Pacheco et al. |
| 2005/0241750 A1 | 11/2005 | McCormack et al. |

FOREIGN PATENT DOCUMENTS

| | | |
|---|---|---|
| DE | 25 03 775 | 8/1976 |
| DE | 25 13 251 | 9/1976 |
| DE | 19833661 | 8/1999 |

| | | |
|---|---|---|
| EP | 0 068 659 A1 | 7/1983 |
| EP | 0 064 853 A1 | 7/1988 |
| EP | 0 090 380 A1 | 12/1990 |
| EP | 419 742 A1 | 4/1991 |
| EP | 432 755 B1 | 6/1991 |
| EP | 0 341 993 B1 | 8/1993 |
| EP | 0556749 | 8/1993 |
| EP | 602 613 B1 | 6/1994 |
| EP | 0 276 100 B1 | 8/1994 |
| EP | 0 575 509 B1 | 10/1994 |
| EP | 0 379 763 B1 | 12/1994 |
| EP | 0 370 835 B1 | 12/1995 |
| EP | 452 727 B1 | 3/1996 |
| EP | 0754544 | 1/1997 |
| EP | 0 409 315 B1 | 5/1997 |
| EP | 0 573 586 B1 | 5/1997 |
| EP | 800 808 A1 | 10/1997 |
| EP | 0 829 566 B1 | 3/1998 |
| EP | 0 551 327 B1 | 6/1998 |
| EP | 0 714 351 B1 | 12/1998 |
| EP | 0 712 304 B1 | 4/1999 |
| EP | 0 782 639 B1 | 10/1999 |
| EP | 0 676 418 B1 | 7/2000 |
| EP | 1 066 962 A2 | 1/2001 |
| EP | 1 068 853 A1 | 1/2001 |
| EP | 1 151 646 A2 | 11/2001 |
| EP | 0 747 402 B1 | 12/2001 |
| EP | 1 091 968 B1 | 1/2002 |
| EP | 0 852 483 B1 | 4/2002 |
| EP | 0 927 096 B1 | 5/2002 |
| EP | 1 216 135 B1 | 5/2003 |
| EP | 1 335 057 A1 | 8/2003 |
| EP | 1440792 A1 | 7/2004 |
| EP | 1068259 | 10/2004 |
| GB | 1521579 | 8/1978 |
| GB | 1526722 | 9/1978 |
| GB | 1526723 | 9/1978 |
| GB | 1526724 | 9/1978 |
| GB | 1553102 | 9/1979 |
| GB | 1579718 | 11/1980 |
| GB | 1598737 | 9/1981 |
| GB | 1598738 | 9/1981 |
| GB | 2 103 537 | 2/1983 |
| GB | 2 115 702 | 9/1983 |
| GB | 2284538 | 6/1995 |
| GB | 2310606 | 9/1997 |
| GB | 2325146 | 11/1998 |
| JP | 60-194947 | 10/1985 |
| JP | 62-078214 | 4/1987 |
| JP | 03-192132 | 8/1991 |
| JP | 07-002922 | 1/1995 |
| JP | 08-003203 | 1/1996 |
| JP | 08-041118 | 2/1996 |
| JP | 08-231625 | 9/1996 |
| JP | 09-241961 | 9/1997 |
| JP | 2001-261868 | 9/2001 |
| JP | 2002069812 | 3/2002 |
| WO | WO 92/01401 | 2/1992 |
| WO | WO93/07228 | 4/1993 |
| WO | WO 93/15251 | 8/1993 |
| WO | WO 94/00292 | 1/1994 |
| WO | WO 96/19346 | 6/1996 |
| WO | WO 97/02133 | 1/1997 |
| WO | WO97/04955 | 2/1997 |
| WO | WO97/29909 | 8/1997 |
| WO | WO 97/45259 | 12/1997 |
| WO | WO 97/49848 | 12/1997 |
| WO | WO 98/02610 | 1/1998 |
| WO | WO 98/04397 | 2/1998 |
| WO | WO 98/05501 | 2/1998 |
| WO | WO 98/05502 | 2/1998 |
| WO | WO98/23804 | 6/1998 |
| WO | WO98/29239 | 7/1998 |
| WO | WO98/29480 | 7/1998 |
| WO | WO 98/29481 | 7/1998 |
| WO | WO 98/29504 | 7/1998 |
| WO | WO 98/31318 | 7/1998 |
| WO | WO 98/48091 | 10/1998 |
| WO | WO 98/51475 | 11/1998 |
| WO | WO98/58799 | 12/1998 |
| WO | WO 99/14039 | 3/1999 |
| WO | WO 99/14044 | 3/1999 |
| WO | WO 99/14046 | 3/1999 |
| WO | WO99/14262 | 3/1999 |
| WO | WO 99/37840 | 7/1999 |
| WO | WO 99/49833 | 7/1999 |
| WO | WO 99/42068 | 8/1999 |
| WO | WO 99/47590 | 9/1999 |
| WO | WO 00/08243 | 2/2000 |
| WO | WO 00/13888 | 3/2000 |
| WO | WO 00/23255 | 4/2000 |
| WO | WO 00/23509 | 4/2000 |
| WO | WO 00/28123 | 5/2000 |
| WO | WO 00/29199 | 5/2000 |
| WO | WO 00/48834 | 8/2000 |
| WO | WO 00/56522 | 9/2000 |
| WO | WO 00/69383 | 11/2000 |
| WO | WO 00/69615 | 11/2000 |
| WO | WO 00/76445 | 12/2000 |
| WO | WO 00/76446 | 12/2000 |
| WO | WO 01/00398 | 1/2001 |
| WO | WO 01/12306 | 2/2001 |
| WO | WO 01/14627 | 3/2001 |
| WO | WO 01/15898 | 3/2001 |
| WO | WO 01/16219 | 3/2001 |
| WO | WO 01/19592 | 3/2001 |
| WO | WO 01/23180 | 4/2001 |
| WO | WO 01/32116 | 5/2001 |
| WO | WO 01/40358 | 6/2001 |
| WO | WO 01/47710 | 7/2001 |
| WO | WO 01/83210 | 11/2001 |
| WO | WO 01/83599 | 11/2001 |
| WO | WO 02/100207 | 12/2002 |
| WO | WO 02/102592 | 12/2002 |
| WO | WO 03/028606 | 4/2003 |
| WO | WO 03/057106 A1 | 7/2003 |
| WO | WO 03/072338 | 9/2003 |
| WO | WO 04/020174 | 3/2004 |

OTHER PUBLICATIONS

"Fibers," Cargill Dow, Internet web page, "http://www.cargilldow.com/fibers.asp", viewed and printed Jul. 23, 2002, pp. 1-4.

Inda (Association of the Nonwoven Fabrics Industry) No. IST-70.4-99, entitled "Standard Test Method for Water Vapor Transmission Rate Through Nonwoven and Plastic Film Using a Guard Film and Vapor Pressure Sensor", 1999.

Wente, V.A. et al., "Manufacture of Super-Fine Organic Fibers", *NRL Report 4364*, May 25, 1954.

Lawrence, K.D. et al., "An Improved Device For The Formation of Super-Fine Thermoplastic Fibers", *NRL Report* 5265 , Feb. 11, 1959.

ASTM D882-97, "Standard Test Method for Tensile Properties of Thin Plastic Sheeting", pp. 159-167, Apr. 1998.

"Olefin Polymers," *Kirk-Othmer Encyclopedia of Chemical Technology*, Fourth Edition, vol. 17, 1996, pp. 765-767.

"PLA Processing Guide for Bulked Continuous Filament (BCF)," Cargill Dow, Internet web page, "http://www.cargilldow.com/pdf/fiberguide.html", viewed and printed Jul. 23, 2002, pp. 1-3.

Lunt, James et al., "Polylactic Acid Polymers from Corn Potential Applications in the Textiles Industry," *Journal of Industrial Textiles*, vol. 29, No. 3, Jan. 2000, pp. 191-205 (reprint pp. 1-8).

Manson, J.A. et al., *Polymer Blends and Composites*, copyright 1976, Plenum Press ISBN-0-306-30831-2, pp. 273-277.

US 5,242,876, 09/1993, Shamshoum et al. (withdrawn)

* cited by examiner

MICROPOROUS BREATHABLE ELASTIC FILM LAMINATES, METHODS OF MAKING SAME, AND LIMITED USE OR DISPOSABLE PRODUCT APPLICATIONS

This application incorporates by reference U.S. patent application bearing Ser. No. 10/646,978, titled Microporous Breathable Elastic Films, Methods of Making Same, and Limited Use or Disposable Product Applications, to Ann Louise McCormack et al. filed on Aug. 22, 2003, and U.S. patent application bearing Ser. No. 60/518,100, titled Microporous Breathable Elastic Film Laminates, Methods of Making Same, and Limited Use or Disposable Product Applications, to Ann Louise McCormack et al., filed on Nov. 7, 2003. This application claims priority from the aforementioned patent applications, and also from U.S. application Ser. No. 10/703,761, filed Nov. 7, 2003.

FIELD OF THE INVENTION

The present invention relates to elastic films and laminates made therefrom, manufacturing methods for making such film laminates, and disposable product applications of such film laminates.

BACKGROUND OF THE INVENTION

Film and film/nonwoven laminates are used in a wide variety of applications, not the least of which is as outercovers/backsheets for limited use or disposable products including personal care absorbent articles such as diapers, training pants, swimwear, incontinence garments, feminine hygiene products, wound dressings, bandages and the like. Film/nonwoven laminates also have applications in the protective cover area, such as car, boat or other object cover components, tents (outdoor recreational covers), and in the health care area in conjunction with such products as surgical drapes, hospital gowns and fenestration reinforcements. Additionally, such materials have applications in other apparel for clean room, health care and other uses such as agricultural fabrics (row covers).

In the personal care area in particular, there has been an emphasis on the development of film laminates which have good barrier properties, especially with respect to liquids, as well as good aesthetic and tactile properties such as hand and feel. There has been a further emphasis on the "stretch" comfort of such laminates, that is, the ability of the laminates to "give" as a result of the product utilizing such laminates being elongated in use, but also to provide a necessary level of vapor permeability to maintain the skin health of a product user.

It is known that breathable polymeric films may be made by utilizing a variety of thermoplastic polymers in combinations with filler particles. These and other desired components, such as additives can be mixed together, heated and then extruded into a monolayer or multilayer filled film. Examples are described in WO 96/19346 to McCormack et al., incorporated by reference herein in its entirety. The filled film may be made by any one of a variety of film forming processes known in the art such as, for example, by using either cast or blown film equipment. The thermoplastic film can then be stretched either alone or as part of a laminate to impart breathability or other desired properties. The films are often stretched in a machine direction orienter-type apparatus, or other stretching device, which stretches the film, thereby creating a pore-like matrix in the film body at the locations of the filler particles. While such breathable films and film/laminates are known to be used as personal care outercover materials, thereby allowing the personal care products to "breathe" and making such products more comfortable to wear, there has been difficulty producing such materials from "elastic"—type materials. Often, such films are produced from polyolefin materials that can be extended without the ability to retract. While such film materials offer the comfort of air/gas circulation, and may offer the ability to extend only, they may limit or restrict movement of a user wearing articles made from such materials. If they are extended to a great extent, they may sag within the product, since they lack the ability to retract, and may in some circumstances, contribute to leakage. Such sagging sacrifices both the aesthetic appearance and the comfort level of the product.

It is has been found that if filler is placed in elastic polymer film formulations, the pores that are formed around the filler particles during a film formation stretch operation (such as in a machine direction orienter) are temporary, and close after stretching, as a result of the elastic attributes of the polymer component in the film. Without the pore structures, the film becomes non-breathable. It therefore is widely recognized that properties relating to elasticity and breathability are often conflicting. As a result of these attributes of highly elastic polymers, when breathable and elastic film materials have been sought for personal care product applications, manufacturers have often turned to inherently breathable elastic materials, that allow gasses to pass or diffuse through their structures, without the necessity for filler-based pores (which risk collapse). Such inherently breathable films may be more costly than other material films, often do not provide the level of breathability desired for consumer product applications, and often have to be fairly thin in order to achieve an acceptable level of breathability. Such thin films often lack the requisite strength/tear strength characteristics desired in personal care products.

It would therefore be desirable to produce filled breathable elastic film laminates of varying basis weights, without the risk of pore collapse. It would further be desirable to produce breathable elastic film laminates that may be further processed so as to impart additional features, but without sacrificing stretch or elastic attributes. It is to such needs that the present invention is directed.

SUMMARY OF THE INVENTION

A method for forming an elastic, breathable film laminate includes the steps of filling a semi-crystalline, predominantly linear polymer with a filler to form a filled polymer such that the filled polymer contains at least 60 percent by weight filler, and desirably at least 70 percent by weight filler; dry-blending a thermoplastic elastomer with the filled polymer to form a blended elastomeric composition, such that the blended elastomeric composition includes between about 25 and 70 percent filler by weight, between about 5 and 30 percent semi-crystalline polymer by weight, and between about 15 and 60 percent by weight elastomer polymer; extruding the blended elastomeric composition into a film; orienting the film in a machine direction between about 2 and 5 times, such that the film produced has a basis weight of between about 15 and 60 gsm and demonstrates a breathability greater than 100 $g/m^2/24$ hours and a load loss value at 50 percent elongation of less than 50 percent, bonding the produced film to a nonwoven layer to produce a film layer/nonwoven layer laminate.

In an alternative embodiment, a method for forming an elastic, breathable film laminate includes the steps of filling a semi-crystalline, predominantly linear polymer with a filler to form a filled polymer such that the filled polymer contains at least 60 percent by weight filler, and desirably at least 70 percent by weight filler; dry-blending a thermoplastic elastomer with the filled polymer to form a blended elastomeric composition, such that the blended elastomeric composition includes between about 25 and 70 percent filler by weight, between about 5 and 30 percent semi-crystalline polymer by weight, and between about 15 and 60 percent by weight elastomeric polymer; extruding the blended elastomeric composition into a film; orienting the film in a machine direction between about 2 and 5 times, such that the film produced has a basis weight of between about 15 and 60 gsm and demonstrates a breathability greater than 100 g/m²/24 hours and a load loss value at 50 percent elongation of less than 50 percent, bonding the produced film to a nonwoven layer which is extensible in the cross machine direction to produce a film layer/nonwoven layer laminate. In still another alternative embodiment the nonwoven layer has been stretched in a grooved roll apparatus. In still another alternative embodiment, the nonwoven layer is stretched in the cross-machine direction and then necked down to its original width prior to being laminated with the film. In still another alternative embodiment, the nonwoven layer is necked.

A method for forming an elastic, breathable film laminate includes the steps of filling a semi-crystalline, predominantly linear polymer with a filler to form a filled polymer such that the filled polymer contains at least 60 percent by weight filler, and desirably at least 70 percent by weight filler; dry-blending a thermoplastic elastomer with the filled polymer to form a blended elastomeric composition, such that the blended elastomeric composition includes between about 25 and 70 percent filler by weight, between about 5 and 30 percent semi-crystalline polymer by weight, and between about 15 and 60 percent by weight elastomer polymer; extruding the blended elastomeric composition into a film; orienting the film in a machine direction between about 2 and 5 times, such that the film produced has a basis weight of between about 15 and 60 gsm and demonstrates a breathability greater than 100 g/m²/24 hours and a load loss value at 50 percent elongation of less than 50 percent, bonding the produced film to a support layer to produce a film/support layer laminate, and stretching the film/support layer laminate in at least the cross-machine direction. In a further alternate embodiment, the stretching step is accomplished by grooved rolls. In still a further alternative embodiment, the stretching step is accomplished by a satellite grooved roll arrangement. In still a further alternative embodiment, the film is adhesively laminated to the support layer. In still a further alternate embodiment, adhesive is applied to the support layer and the support layer is then laminated to the film. In still a further alternative embodiment, adhesive is applied via a slot coating adhesive system. In still a further embodiment, the stretched laminate is annealed. In yet another alternative embodiment, the support layer is first stretched via a grooved roll arrangement prior to being laminated with the film. In yet another alternative embodiment, the support layer is first necked.

An elastic, breathable film/nonwoven layer laminate includes a film including a thermoplastic elastomer polymer and a filled semi crystalline predominantly linear polymer. The film includes between about 25 and 70 weight percent filler, between about 5 and 30 by weight percent semi-crystalline linear polymer, and between about 15 and 60 by weight elastomeric polymer. The filler is closely associated with the semi-crystalline linear polymer and the laminate demonstrates a breathability of greater than 100 g/m²/24 hours. The laminate also includes a nonwoven layer bonded to the film layer. The film/nonwoven layer laminate demonstrates a load loss value at 50 percent elongation of less than about 75 percent. In one embodiment, the nonwoven layer is adhesively laminated to the film.

A method for forming an elastic, breathable film/nonwoven layer laminate includes the steps of filling a semi-crystalline, predominantly linear polymer with a filler to form a filled polymer such that said filled polymer contains at least 60 percent filler, and desirably at least 70 percent by weight filler; dry-blending a thermoplastic elastomer with the filled polymer to form a blended elastomeric polymer composition, such that the blended elastomer polymer composition includes between about 25 and 70 percent filler by weight, between about 5 and 30 percent semi-crystalline polymer by weight, and between about 15 and 60 percent by weight elastomer polymer; extruding the blended elastomeric polymer composition into a film; orienting the film in a machine direction between about 2 and 5 times, such that the film produced has a basis weight of between about 15 and 60 gsm and demonstrates a breathability greater than 100 g/m²/24 hours, and bonding the produced film to a nonwoven layer to produce a film/nonwoven layer laminate demonstrating a load loss value at 50 percent elongation, when stretched to a 70 percent elongation, of less than about 75 percent.

In an alternative embodiment of the method, the thermoplastic elastomer is a block copolymer. In still another alternative embodiment of the method, the laminate load loss is less than about 65 percent. In still another alternative embodiment of the method, the laminate load loss is less than about 55 percent. In still another alternative embodiment of the method, the laminate percent set is less than about 30 percent. In still another alternative embodiment of the method, the laminate percent set is less than about 25 percent. In still another alternative embodiment of the method, the laminate percent set is less than about 20 percent. In still another alternative embodiment of the method, the semi-crystalline polymer is a polyethylene or polyethylene copolymer having a melt index greater than 5 g/10 min. In still another alternative embodiment of the method, the semi-crystalline polymer is a polyethylene or polyethylene copolymer having a melt index greater than 10 g/10 min. In still another alternative embodiment of the method, the semi-crystalline polymer is a polyethylene or polyethylene copolymer having a density greater than about 0.910 g/cc. In still another alternative embodiment of the method, the semi-crystalline polymer is a polyethylene or polyethylene copolymer having a melt index greater than 10 g/10 min. and a density greater than 0.915 g/cc. In still another alternative embodiment of the method, the semi-crystalline polymer is a polyethylene or polyethylene copolymer having a melt index greater than about 20 g/10 min. In still another alternative embodiment of the method, the semi-crystalline polymer has a density of about 0.917 g/cc. In still another alternative embodiment of the method, the semi-crystalline polymer has a density of greater than about 0.917 g/cc. In still another alternative embodiment of the method, the semi-crystalline polymer has a density of between about 0.917 g/cc and 0.960 g/cc. In still another alternative embodiment of the method, the semi-crystalline polymer has a density of between about 0.923 g/cc and 0.960 g/cc. In still another alternative embodiment of the method, the semi-crystalline polymer is a polypropylene or polypropylene copolymer having a melt flow rate of greater than 10 g/10 min. and a density between about 0.89 g/cc and 0.90 g/cc. In still another embodiment, the melt flow rate would be greater than about 20 g/10 min.

An elastic, breathable film/nonwoven layer laminate is also contemplated which laminate includes a film including a thermoplastic elastomer and a filled semi crystalline predominantly linear polymer. The film includes between about 25 and 70 weight percent filler, between about 5 and 30 by weight percent semi-crystalline linear polymer, and between about 15 and 60 by weight elastomer polymer. The filler is closely associated with the semi-crystalline linear polymer. The film layer demonstrates a breathability of greater than 100 g/m$^2$/24 hours. The laminate also includes a nonwoven layer bonded to the film. The film laminate demonstrates a load loss value at 50 percent elongation, when stretched to a 70 percent elongation, of less than about 75 percent.

In an alternative embodiment of the laminate, the laminate demonstrates a load loss of less than about 65 percent. In still another alternative embodiment of the laminate, the laminate demonstrates a load loss of less than about 55 percent. In still another alternative embodiment of the laminate, the laminate demonstrates a percent set of less than about 30 percent. In still another alternative embodiment of the laminate, the laminate demonstrates a percent set of less than about 25 percent. In still another alternative embodiment of the laminate, the laminate demonstrates a percent set of less than about 20 percent. In still another alternative embodiment of the laminate, the semi-crystalline polymer is a polyethylene or polyethylene copolymer having a melt index greater than 10 g/10 min. and a density greater than 0.915 g/cc. In still another alternative embodiment of the laminate, the semi-crystalline polymer is a polyethylene or polyethylene copolymer having a melt index greater than about 20 g/10 min. In still another alternative embodiment of the laminate, the semi-crystalline polymer has a density of about 0.917 g/cc. In still another alternative embodiment of the laminate, the semi-crystalline polymer has a density of greater than about 0.917 g/cc. In still another alternative embodiment of the laminate, the semi-crystalline polymer has a density of between about 0.917 g/cc and 0.960 g/cc. In still another alternative embodiment of the laminate the semi-crystalline polymer has a density of between about 0.923 g/cc and 0.960 g/cc. In still another alternative embodiment of the laminate, the semi-crystalline polymer is a polypropylene or polypropylene copolymer having a melt flow rate of greater than 20 g/10 min. and a density between about 0.89 g/c and 0.90 g/cc.

In still a further alternative embodiment, an elastic, breathable film layer/nonwoven layer laminate includes a film, including a thermoplastic elastomer and a filled semi crystalline polymer. The film includes between about 25 and 70 weight percent filler, between about 5 and 30 by weight percent semi-crystalline polymer, and between about 15 and 60 by weight percent elastomer. The filler is closely associated with said semi-crystalline polymer. The nonwoven layer is bonded to the film and the film/nonwoven laminate demonstrates a load loss value at 50 percent elongation, when stretched to a 70 percent elongation, of less than about 75 percent and a breathability of greater than about 100 g/m$^2$/24 hours. In still a further alternative embodiment of the laminate, the thermoplastic elastomer is a block copolymer. In still a further alternative embodiment of the laminate, the semi-crystalline polymer is a polyethylene or polyethylene copolymer having a melt index greater than 10 g/10 min. and a density greater than 0.915 g/cc. In still a further alternative embodiment of the laminate, the semi-crystalline polymer is a polyethylene or polyethylene copolymer having a melt index greater than about 20 g/10 min. In still a further alternative embodiment of the laminate, the semi-crystalline polymer has a density of about 0.917 g/cc. In still a further alternative embodiment of the laminate, the semi-crystalline polymer has a density of greater than about 0.917 g/cc. In still a further alternative embodiment of the laminate, the semi-crystalline polymer has a density of between about 0.917 g/cc and 0.960 g/cc. In still a further alternative embodiment of the laminate, the semi-crystalline polymer has a density of between about 0.923 g/cc and 0.960 g/cc. In still a further alternative embodiment of the laminate, the semi-crystalline polymer is a polypropylene or polypropylene copolymer having a melt flow rate of greater than 20 g/10 min. and a density between about 0.89 g/c and 0.90 g/cc. In still a further alternative embodiment, the laminate is incorporated into a personal care product as a hook engageable outercover. In still a further alternative embodiment, the laminate is incorporated into a personal care product as a liner or outercover. In still a further alternative embodiment the laminate is incorporated into a personal care product. In still a further alternative embodiment the laminate is incorporated into a recreational outdoor cover. In an alternative embodiment the laminate is incorporated into a disposable protective garment.

In still a further alternative embodiment a method for forming an elastic, breathable film laminate includes the steps of filling a semi-crystalline polymer with a filler to form a filled polymer such that the filled polymer contains at least 60 percent by weight filler; dry-blending a thermoplastic elastomer polymer with the filled polymer to form a blended elastomeric composition, such that the blended elastomeric composition includes between about 25 and 70 percent filler by weight, between about 5 and 30 percent semi-crystalline polymer by weight, and between about 15 and 60 percent by weight elastomer polymer; extruding the blended elastomer polymer composition into a film; orienting the film in a machine direction between about 2 and 5 times, bonding the produced film to a nonwoven layer to produce a film layer/nonwoven layer laminate. In an alternative embodiment at least 70 weight percent filler is filled with the semi-crystalline polymer. In still a further alternative embodiment, the nonwoven layer is necked prior to bonding with the produced film. In still a further alternative embodiment, the nonwoven layer is stretched in the cross-machine direction and then necked down to its original width prior to being bonded to the film.

BRIEF DESCRIPTION OF THE DRAWINGS

The invention will be better understood by reference to the following description of embodiments of the invention taken in conjunction with the accompanying drawings, wherein.

DETAILED DESCRIPTION OF THE INVENTION

Figure 1:
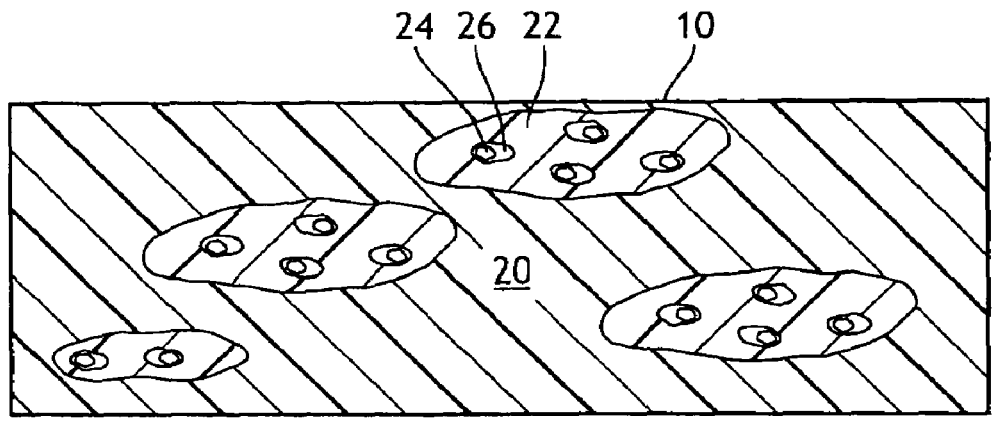
FIG. 1 is a cross sectional view of a film made in accordance with the invention.

Definitions:

As used herein, the term "personal care product" means diapers, training pants, swimwear, absorbent underpants, adult incontinence products, and feminine hygiene products, such as feminine care pads, napkins and pantiliners.

As used herein the term "protective outer wear" means garments used for protection in the workplace, such as surgical gowns, hospital gowns, masks, and protective coveralls.

As used herein, the term "protective cover" means covers that are used to protect objects such as for example car, boat and barbeque grill covers, as well as agricultural fabrics.

As used herein, the terms "polymer" and "polymeric" generally include but are not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries.

As used herein, the terms "machine direction" or MD means the direction along the length of a fabric in the direction in which it is produced. The terms "cross machine direction," "cross directional," or CD mean the direction across the width of fabric, i.e. a direction generally perpendicular to the MD.

As used herein, the term "nonwoven web" means a polymeric web having a structure of individual fibers or threads which are interlaid, but not in an identifiable, repeating manner. Nonwoven webs have been, in the past, formed by a variety of processes such as, for example, meltblowing processes, spunbonding processes, hydroentangling, air-laid and bonded carded web processes.

As used herein, the term "bonded carded webs" refers to webs that are made from staple fibers which are usually purchased in bales. The bales are placed in a fiberizing unit/picker which separates the fibers. Next, the fibers are sent through a combining or carding unit which further breaks apart and aligns the staple fibers in the machine direction so as to form a machine direction-oriented fibrous non-woven web. Once the web has been formed, it is then bonded by one or more of several bonding methods. One bonding method is powder bonding wherein a powdered adhesive is distributed throughout the web and then activated, usually by heating the web and adhesive with hot air. Another bonding method is pattern bonding wherein heated calendar rolls or ultrasonic bonding equipment is used to bond the fibers together, usually in a localized bond pattern through the web and or alternatively the web may be bonded across its entire surface if so desired. When using bi-component staple fibers, through-air bonding equipment is, for many applications, especially advantageous.

As used herein the term "spunbond" refers to small diameter fibers which are formed by extruding molten thermoplastic material as filaments from a plurality of fine, usually circular capillaries of a spinneret with the diameter of the extruded filaments being rapidly reduced as by for example in U.S. Pat. No. 4,340,563 to Appel et al., and U.S. Pat. No. 3,692,618 to Dorschner et al., U.S. Pat. No. 3,802,817 to Matsuki et al., U.S. Pat. No. 3,338,992 and U.S. Pat. No. 3,341,394 to Kinney, U.S. Pat. No. 3,542,615 to Dobo et al., which are each incorporated by reference in their entirety herein.

As used herein the term "meltblown" means fibers formed by extruding a molten thermoplastic material through a plurality of fine, usually circular die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, in various patents and publications, including NRL Report 4364, "Manufacture of Super-Fine Organic Fibers" by B. A. Wendt, E. L. Boone and D. D. Fluharty; NRL Report 5265, "An Improved Device For The Formation of Super-Fine Thermoplastic Fibers" by K. D. Lawrence, R. T. Lukas, J. A. Young; and U.S. Pat. No. 3,849,241, issued Nov. 19, 1974, to Butin, et al.

As used herein the terms "sheet" and "sheet material" shall be interchangeable and in the absence of a word modifier, refer to woven materials, nonwoven webs, polymeric films, polymeric scrim-like materials, and polymeric foam sheeting.

The basis weight of nonwoven fabrics is usually expressed in ounces of material per square yard (osy) or grams per square meter ($g/m^2$ or gsm) and the fiber diameters useful are usually expressed in microns. (Note that to convert from osy to gsm, multiply osy by 33.91). Film thicknesses may also be expressed in microns.

As used herein the term "laminate" refers to a composite structure of two or more sheet material layers that have been adhered through a bonding step, such as through adhesive bonding, thermal bonding, point bonding, pressure bonding, extrusion coating or ultrasonic bonding.

As used herein, the term "elastomeric" shall be interchangeable with the term "elastic" and refers to sheet material which, upon application of a stretching force, is stretchable in at least one direction (such as the CD direction), and which upon release of the stretching force contracts/returns to approximately its original dimension. For example, a stretched material having a stretched length which is at least 50 percent greater than its relaxed unstretched length, and which will recover to within at least 50 percent of its stretched length upon release of the stretching force. A hypothetical example would be a one (1) inch sample of a material which is stretchable to at least 1.50 inches and which, upon release of the stretching force, will recover to a length of not more than 1.25 inches. Desirably, such elastomeric sheet contracts or recovers up to 50 percent of the stretch length in the cross machine direction using a cycle test as described herein to determine percent set. Even more desirably, such elastomeric sheet material recovers up to 80 percent of the stretch length in the cross machine direction using a cycle test as described. Even more desirably, such elastomeric sheet material recovers greater than 80 percent of the stretch length in the cross machine direction using a cycle test as described. Desirably, such elastomeric sheet is stretchable and recoverable in both the MD and CD directions. For the purposes of this application, values of load loss and other "elastomeric functionality testing" have been generally measured in the CD direction, unless otherwise noted. Unless otherwise noted, such test values have been measured at the 50 percent elongation point of a 70 percent total elongation cycle.

As used herein, the term "elastomer" shall refer to a polymer which is elastomeric.

As used herein, the term "thermoplastic" shall refer to a polymer which is capable of being melt processed.

As used herein, the term "inelastic" or "nonelastic" refers to any material which does not fall within the definition of "elastic" above.

As used herein, the term "breathable" refers to a material which is permeable to water vapor. The water vapor transmission rate (WVTR) or moisture vapor transfer rate (MVTR) is measured in grams per square meter per 24 hours, and shall be considered equivalent indicators of breathability. The term "breathable" desirably refers to a material which is permeable to water vapor having a minimum WVTR (water vapor transmission rate) of desirably about 100 g/m$^2$/24 hours. Even more desirably, such material demonstrates breathability greater than about 300 g/m$^2$/24 hours. Still even more desirably, such material demonstrates breathability greater than about 1000 g/m$^2$/24 hours.

The WVTR of a fabric, in one aspect, gives an indication of how comfortable a fabric would be to wear. WVTR is measured as indicated below. Often, personal care product applications of breathable barriers desirably have higher WVTRs and breathable barriers of the present invention can have WVTRs exceeding about 1,200 g/m$^2$/24 hours, 1,500 g/m$^2$/24 hours, 1,800 g/m$^2$/24 hours or even exceeding 2,000 g/m$^2$/24 hours.

As used herein, the term "multilayer laminate" means a laminate including a variety of different sheet materials. For instance, a multi-layered laminate may include some layers of spunbond and some meltblown such as a spunbond/meltblown/spunbond (SMS) laminate and others as disclosed in U.S. Pat. No. 4,041,203 to Brock et al., U.S. Pat. No. 5,169,706 to Collier, et al., U.S. Pat. No. 5,145,727 to Potts et al., U.S. Pat. No. 5,178,931 to Perkins et al., and U.S. Pat. No. 5,188,885 to Timmons et al., each incorporated by reference in their entirety. Such a laminate may be made by sequentially depositing onto a moving forming belt first a spunbond fabric layer, then a meltblown fabric layer and last another spunbond layer and then bonding the laminate. Alternatively, the fabric layers may be made individually, collected in rolls, and combined in a separate bonding step or steps. Multilayer laminates may also have various numbers of meltblown layers or multiple spunbond layers in many different configurations and may include other materials like films or coform materials, e.g. SMMS, SM, SFS.

As used herein, the term "coform" means a process in which at least one meltblown diehead is arranged near a chute through which other materials are added to the web while it is forming. Such other materials may be pulp, superabsorbent particles, cellulose or staple fibers, for example. Coform processes are shown in U.S. Pat. No. 4,818,464 to Lau and U.S. Pat. No. 4,100,324 to Anderson et al., each incorporated by reference in their entirety.

As used herein, the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such conjugate fiber may be, for example, a sheath/core arrangement wherein one polymer is surrounded by another or may be a side by side arrangement, a pie arrangement or an "islands-in-the-sea" arrangement. Conjugate fibers are taught in U.S. Pat. No. 5,108,820 to Kaneko et al., U.S. Pat. No. 4,795,668 to Krueger et al., and U.S. Pat. No. 5,336,552 to Strack et al. Conjugate fibers are also taught in U.S. Pat. No. 5,382,400 to Pike et al., and may be used to produce crimp in the fibers by using the differential rates of expansion and contraction of the two or more polymers. For two component fibers, the polymers may be present in varying desired ratios. The fibers may also have shapes such as those described in U.S. Pat. No. 5,277,976 to Hogle et al., U.S. Pat. No. 5,466,410 to Hills and U.S. Pat. Nos. 5,069,970 and 5,057,368 to Largman et al., which describe fibers with unconventional shapes.

As used herein the term "thermal point bonding" involves passing a fabric or web of fibers to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings, incorporated herein by reference in its entirety. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen pattern having a bond area in the range of from about 15% to about 21% and about 302 bonds per square inch.

Typically, the percent bonding area varies from around 10% to around 30% of the area of the fabric laminate web. As is well known in the art, the spot bonding holds the laminate layers together as well as imparts integrity to each individual layer by bonding filaments and/or fibers within each layer.

As used herein, the term "ultrasonic bonding" means a process performed, for example, by passing the fabric between a sonic horn and anvil roll as illustrated in U.S. Pat. No. 4,374,888 to Bornslaeger, incorporated by reference herein in its entirety.

As used herein, the term "adhesive bonding" means a bonding process which forms a bond by application of an adhesive. Such application of adhesive may be by various processes such as slot coating, spray coating and other topical applications. Further, such adhesive may be applied within a product component and then exposed to pressure such that contact of a second product component with the adhesive containing product component forms an adhesive bond between the two components.

As used herein and in the claims, the term "comprising" is inclusive or open-ended and does not exclude additional unrecited elements, compositional components, or method steps. Accordingly, such terms are intended to be synonymous with the words "has", "have", "having", "includes", "including", and any derivatives of these words.

As used herein the terms "recover", "recovery" and "recovered" shall be used interchangeably and shall refer to a contraction (retraction) of a stretched material upon termination of a stretching force following stretching of the material by application of the stretching force. For example, if a material having a relaxed, unstretched length of 1 inch (2.5 cm) is elongated fifty percent by stretching to a length of 1.5 inches (3.75 cm), the material would be elongated 50 percent and would have a stretched length that is 150 percent of its relaxed length or stretched 1.5× (times). If this exemplary stretched material contracted, that is recovered to a length of 1.1 inches (2.75 cm) after release of the stretching force, the material would have recovered 80 percent of its 0.5 inch (1.25 cm) elongation. Percent recovery may be expressed as [(maximum stretch length–final sample length)/(maximum stretch length–initial sample length)]×100.

As used herein the term "extensible" means elongatable in at least one direction, but not necessarily recoverable.

As used herein the term "percent stretch" refers to the ratio determined by measuring the increase in the stretched dimension and dividing that value by the original dimension. i.e. (increase in stretched dimension/original dimension)× 100.

As used herein the term "set" refers to retained elongation in a material sample following the elongation and recovery, i.e. after the material has been stretched and allowed to relax during a cycle test.

As used herein the term "percent set" is the measure of the amount of the material stretched from its original length after being cycled (the immediate deformation following the cycle test). The percent set is where the retraction curve of a cycle crosses the elongation axis. The remaining strain after removal of the applied stress is measured as the percent set.

The "load loss" value is determined by first elongating a sample to a defined elongation in a particular direction (such as the CD) of a given percentage (such as 70, or 100 percent as indicated) and then allowing the sample to retract to an amount where the amount of resistance is zero. The cycle is repeated a second time and the load loss is calculated at a given elongation, such as at the 50 percent elongation. Unless otherwise indicated, the value was read at the 50% elongation level (on a 70 percent elongation test) and then used in the calculation. For the purposes of this application, the load loss was calculated as follows:

$$\frac{\text{cycle 1 extension tension (at 50\% elongation)} - \text{cycle 2 retraction tension (at 50\% elongation)} \times 100}{\text{cycle 1 extension tension (at 50\% elingation)}}$$

For the test results reflected in this application, the defined elongation was 70 percent unless otherwise noted. The actual test method for determining load loss values is described below.

As used herein, a "filler" is meant to include particulates and/or other forms of materials which can be added to a film polymer extrusion material which will not chemically interfere with or adversely affect the extruded film and further which are capable of being dispersed throughout the film. Generally the fillers will be in particulate form with average particle sizes in the range of about 0.1 to about 10 microns, desirably from about 0.1 to about 4 microns. As used herein, the term "particle size" describes the largest dimension or length of the filler particle.

As used herein the terms semi-crystalline, predominantly linear polymer and semi-crystalline polymer shall refer to polyethylene, polypropylene, blends of such polymers and copolymers of such polymers. For such polyethylene-based polymers, such term shall be defined to mean polymers having a melt index of greater than about 5 g/10 min, but desirably greater than 10 g/10 min (Condition E at 190° C., 2.16 kg) and a density of greater than about 0.910 g/cc, but desirably greater than about 0.915 g/cc. In one embodiment, the density is between about 0.915 g/cc and 0.960 g/cc. In a further alternative embodiment, the density is between about 0.917 g/cc and 0.960 g/cc. In still a further alternative embodiment, the density is between about 0.917 g/cc and 0.923 g/cc. In still a further alternative embodiment, the density is between about 0.923 g/cc and 0.960 g/cc. For such polypropylene based polymers, such term shall be defined to mean polymers having a melt flow rate (230° C., 2.16 kg) greater than about 10 g/10 min., but desirably greater than about 20 g/10 min., and having a density in the range between about 0.89 g/cc and 0.90 g/cc.

Unless otherwise indicated, percentages of components in formulations are by weight.

Test Method Procedures:

Water Vapor Transmission Rate (WVTR) or Breathability:

A suitable technique for determining the WVTR (water vapor transmission rate) value of a film or laminate material of the invention is the test procedure standardized by INDA (Association of the Nonwoven Fabrics Industry), number IST-70.4–99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated by reference herein. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. This information is used to calculate the transmission rate at which moisture is transmitted through the test material according to the equation:

$$TR^{-1}_{test\ material} = TR^{-1}_{test\ material,\ guardfilm,\ airgap} - TR^{-1}_{guardfilm,\ airgap}$$

Calculations:
WVTR: The calculation of the WVTR uses the formula:

$$WVTR = F\rho_{sat}(T)RH/(Ap_{sat}(T)(1-RH))$$

where:
F=The flow of water vapor in cc/min.,
$\rho_{sat}(T)$=The density of water in saturated air at temperature T,
RH=The relative humidity at specified locations in the cell,
A=The cross sectional area of the cell, and,
$P_{sat}(T)$=The saturation vapor pressure of water vapor at temperature T.

For the purposes of this Application, the testing temperature for the above test was at about 37.8° C., the flow was at 100 cc/min, and the relative humidity was at 60%. Additionally, the value for n was equal to 6 and the number of cycles was 3.

Cycle Testing:

The materials were tested using a cyclical testing procedure to determine load loss and percent set. In particular 2 cycle testing was utilized to 70 percent defined elongation. For this test, the sample size was 3 inch in the MD by 6 inch in the CD. The Grip size was 3 inch width. The grip separation was 4 inch. The samples were loaded such that the cross-direction of the sample was in the vertical direction. A preload of approximately 10–15 grams was set. The test pulled the sample at 20 inches/min (500 mm/min) to 70 percent elongation (2.8 inches in addition to the 4 inch gap), and then immediately (without pause) returned to the zero point (the 4 inch gauge separation). In-process testing (resulting in the data in this application) was done as a 2 cycle test. The results of the test data are all from the first and second cycles. The testing was done on a Sintech Corp. constant rate of extension tester 2/S with a Renew MTS mongoose box (controller) using TESTWORKS 4.07b software. (Sintech Corp, of Cary, N.C.). The tests were conducted under ambient conditions.

Melt Index or Melt Flow Rate:

Melt Index or Melt Flow Rate (depending on the polymer being tested) is a measure of how easily a resin flows at a given temperature and shear rate, and can be determined using ASTM Standard D1238, condition 190° C./2.16 kg (Condition E) generally for polyethylene-based polymers. The melt index test data in this application were produced in accordance with this method and condition. In general, a polymer having a high melt index has a low viscosity. For polypropylene-based polymers, a similar analysis is conducted for melt flow rate at a condition of 230° C. and 2.16 kg. In accordance with the present invention the combination of melt index or melt flow rate (depending on polymer) and density parameters of the carrier resin results in the improved two phase film with increased ability for the carrier resin to aid in processing and to retain pore formation following stretching. In particular, it has been determined that non-elastic, more crystalline carrier resins with higher MI values (above about 5 g/10 minutes) and density values (for polyethylene-based polymers) were particularly effective at producing breathable films without sacrificing elastic performance. In particular, carrier resins such as polyethylenes and polyethylene copolymers with densities greater than about 0.910 g/cc are desirable. Such carrier resins with densities greater than about 0.915 g/cc are desirable. Such carrier resins with densities about 0.917 g/cc are desirable. Such carrier resins with densities greater than about 0.917 g/cc are also desirable. In still a further embodiment, such carrier resins with densities between about 0.917 g/cc and 0.923 g/cc are desirable. In still a further embodiment, such carrier resins with densities between 0.917 g/cc and 0.960 g/cc are also desirable. In still a further alternative embodiment, such carrier resins with densities between about 0.923 g/cc and 0.960 g/cc are also desirable. In an alternative, polypropylene-based carrier resins with lower densities such as at about 0.89 g/cc, would also be useful, especially those with 10 g/10 min. melt flow rate (MFR) or greater (Conditions of 230° C.; 2.16 kg). In an alternative embodiment, the melt flow rate would be greater than about 20 g/10 min. In still another alternative embodiment, polypropylene-based carrier resins with densities between about 0.89 g/cc and 0.90 g/cc can also be utilized. It is also desirable to blend such carrier resins separately with a filler, prior to blending the carrier/filler mixture with the elastomer component. It is desirable that the filler be maintained in close association with the carrier rather than blending any filler directly with the elastomer component, such that the carrier resin forms filler rich pockets within the elastomer component.

The present invention intends to overcome the earlier described problems of prior art elastic filled film/non-woven (support layer) laminates. The problems are addressed by a filled film/non-woven laminate wherein the film composition provides breathability and elasticity without pore collapse. Further advantages, features, aspects and details of the invention are evident from the claims, the description and the accompanying drawings. Two methods of formulating films for making breathable filled films (as part of film/ support layer laminates) are a concentrate letdown approach and a fully compounded approach. For the purposes of the films of the current laminate applications, the concentrate letdown approach is desirable. In the concentrate letdown process, one resin is used as a carrier resin to make a concentrate with a filler. In the current application, the carrier resin, typically a high melt index or melt flow rate/low viscosity resin with higher density level (0.910–0.960 g/cc) for polyethylene-based polymers, and a density level between about 0.89 g/cc and 0.90 g/cc for polypropylene-based polymers, is used to disperse high loadings of filler. The elastic letdown resin dominates the properties of the film in the laminate. The concentrate is let down (combined) with elastic resin to dilute the final filler content to a desired percentage.

The elastic, thermoplastic filled breathable film (of the film/support layer laminate) of the present invention is made from a thermoplastic elastomer let down resin, desirably a block copolymer let down resin (such as a styrenic block copolymer), that has been blended with a semi-crystalline, predominantly linear polymer (carrier resin) which includes a filler (the "concentrate"). Desirably, the elastic polymer is blended with a single screw extruder so as to avoid substantial mixing of the polymer phases, and retain pockets of the carrier resin within the letdown resin. The filler, such as calcium carbonate, creates filled regions within the extruded film, that can be stretched to form pores at the semi-crystalline polymer/filler interface, without negatively impacting the elastic recovery of the non-filled elastic polymer component. It is theorized that the pores in the filled regions do not collapse as the formed pores are surrounded by a semi-crystalline polymer shell. As was stated previously, either higher density polyethylene-based carrier resins or polypropylene-based carrier resins with densities between about 0.89 g/cc and 0.90 g/cc are preferred. Desirably, the filled carrier semi-crystalline polymer (filled polymer or concentrate) is compounded with the filler prior to combining with the thermoplastic elastomer let down resin to surround the filler particles only with the semi crystalline polymer, thus forming a predominantly non-elastic shell around the filler particles, capable of pore formation and retention when the film of this composition is stretched.

As can be seen in FIG. 1, which illustrates a cross sectional view of a film (product film that has been stretched prior to lamination) and made in accordance with the invention, the film 10 includes an elastomeric component 20. Semi-crystalline polymer/filler rich pockets 22 are dispersed throughout the elastomeric component, desirably with the filler isolated to the carrier resin locations. Filler particles 24 are contained within the semi-crystalline polymer pockets or pores. The pores are created by the hard shell/walls of the semi-crystalline polymer phase within the elastomeric polymer phase. The pores/spaces 26 are formed between the semi-crystalline polymers and the filler particles as the film is stretched in a machine direction orienter or other stretching device. Since the shells are made of a semi-crystalline material, they retain much of their shape, albeit in a compressed or elongated oval-type shape when stretched uniaxially, rather than a perfectly circular configuration. The shells retain a more circular configuration when stretched biaxially. It should be recognized that the illustration of FIG. 1 is a stylized schematic image.

Various thermoplastic elastomers are contemplated for use in this invention. However, thermoplastic block copolymers such as styrenic block copolymers are desirable examples of useful elastic polymers of the invention. Specific examples of useful styrenic block copolymers include hydrogenated polyisoprene polymers such as styrene-ethylenepropylene-styrene (SEPS), styrene-ethylenepropylene-styrene-ethylenepropylene (SEPSEP), hydrogenated polybutadiene polymers such as styrene-ethylenebutylene-styrene (SEBS), styrene-ethylenebutylene-styrene-ethylenebutylene (SEBSEB), styrene-butadiene-styrene (SBS), styrene-isoprene-styrene (SIS), and hydrogenated poly-isoprene/butadiene polymer such as styrene-ethylene-ethylenepropylene-styrene (SEEPS). Polymer block configurations such as diblock, triblock, multiblock, star and radial are also contemplated in this invention. In some instances, higher molecular weight block copolymers may be desirable. Block copolymers are available from Kraton Polymers U.S. LLC of Houston, Tex. under the designations Kraton D or G polymers, for example G1652 and G1657 and Septon Company of America, Pasadena, Tex. under the designations Septon 2004, Septon 4030, and Septon 4033. Another potential supplier of such polymers includes Dynasol of Spain. In particular, Septon 2004 SEPS triblock polymer is particularly suitable for the invention. Blends of such elastomeric materials are also contemplated as the "elastomeric component". For instance, a blend of G1652 and G1657 may be utilized, such that an elastomeric component may be present in a final film formulation at about 33% by weight (10 percent (of the total film formula) of which is G1652 and 23 percent (of the total film formula) of which is G1657). Such an embodiment could include filler concentrate as the remaining 67 percent by weight. In one embodiment, it is desirable that the styrenic block copolymer is a SEPS polymer. The thermoplastic elastomers may themselves include processing aids and or tackifiers associated with the elastomeric polymers themselves.

Other thermoplastic elastomers useful in the invention include olefinic-based elastomers such as EP rubber, ethyl, propyl, butyl terpolymers, block and copolymers thereof.

Desirably, the film of the filler, carrier resin and elastomeric letdown resin materials includes between about 15 and 50 weight percent elastomeric polymer component. More desirably, the product film of the blended materials includes between about 20 and 40 weight percent elastomer. It should be recognized, that when the elastomer component of the blended elastomeric composition is given, it may include neat base resins along with processing aids such as low molecular weight hydrocarbon materials such as waxes, amorphous polyolefins and/or tackifiers.

Both organic and inorganic fillers are contemplated for use with the present invention, provided they do not interfere with the film forming process and/or subsequent laminating processes. Examples of fillers include calcium carbonate ($CaCO_3$), various clays, silica ($SiO_2$), alumina, barium sulfate, sodium carbonate, talc, magnesium sulfate, titanium dioxide, zeolites, aluminum sulfate, cellulose-type powders, diatomaceous earth, gypsum, magnesium sulfate, magnesium carbonate, barium carbonate, kaolin, mica, carbon, calcium oxide, magnesium oxide, aluminum hydroxide, pulp powder, wood powder, cellulose derivatives, polymeric particles, chitin and chitin derivatives.

The filler particles may optionally be coated with a fatty acid, such as stearic acid or behenic acid, and/or other material in order to facilitate the free flow of the particles (in bulk) and their ease of dispersion into the carrier polymer. One such filler is calcium carbonate sold under the brand Supercoat®, of Imerys of Roswell, Ga. Another is Omyacarb® 2 SS T of Omya, Inc. North America of Proctor, Vt. The latter filler is coated with stearic acid. Desirably, the amount of filler in the product film (final film formulation) is between about 40 and 70 weight percent. More desirably, the amount of filler in the product film is between about 45 and 60 weight percent.

Examples of semi-crystalline carrier polymers useful in compounding with filler include, but are not limited to predominantly linear polyolefins (such as polypropylene and polyethylene) and copolymers thereof. Such carrier materials are available from numerous sources. Specific examples of such semi-crystalline polymers include Dow polyethylenes such as Dowlex 2517 (25 Ml, 0.917 g/cc); Dow LLDPE DNDA-1082 (155 Ml, 0.933 g/cc), Dow LLDPE DNDB-1077 (100 Ml, 0.929 g/cc), Dow LLDPE 1081 (125 Ml, 0.931 g/cc), and Dow LLDPE DNDA 7147 (50 Ml, 0.926 g/cc). In some instances, higher density polymers may be useful, such as Dow HDPE DMDA-8980 (80 Ml, 0.952 g/cc). Additional resins include Escorene LL 5100, having a Ml of 20 and a density of 0.925 and Escorene LL 6201, having a Ml of 50 and a density of 0.926 from ExxonMobil.

In an alternative, polypropylene carrier resins with lower densities such as at about 0.89 g/cc, would also be useful, especially those with 20 MFR or greater (Conditions of 230° C.; 2.16 kg) Polypropylenes having a density of between 0.89 and 0.90 g/cc would be useful, such as homopolymers and random copolymers, such as ExxonMobil PP3155 (36MFR), PP1074KN (20 MFR), PP9074MED (24 MFR) and Dow 6D43 (35 MFR).

It is desirable that the melt index of the semi-crystalline polymer (for polyethylene-based polymers) be greater than about 5 g/10 min or more desirably greater than about 10 g/10 min, as measured by ASTM D1238 (2.16 kg, 190° C.). More desirably, the melt index of the semi-crystalline polymer is greater than about 20 g/10 min. Desirably, the semi-crystalline carrier polymer has a density of greater than about 0.910 g/cc for polyethylene-based polymers. Even more desirably, the density is greater than about 0.915 g/cc. Even more desirably, the density is about 0.917 g/cc. In another alternative embodiment, the density is greater than 0.917 g/cc. In still another alternative embodiment, the density is between about 0.917 and 0.923 g/cc. In still another alternative embodiment, the semi-crystalline carrier polymer has a density between about 0.917 and 0.960 g/cc. In still another alternative embodiment, the semi-crystalline carrier polymer has a density between about 0.923 g/cc and 0.960 g/cc. It is also desirable that the film contains between about 10 and 25 weight percent semi-crystalline polymer.

In addition, the breathable filled film may optionally include one or more stabilizers or processing aids. For instance, the filled-film may include an anti-oxidant such as, for example, a hindered phenol stabilizer. Commercially available anti-oxidants include, but are not limited to, IRGANOX™ E 17 (a-tocopherol) and IRGANOX™ 1076 (octodecyl 3,5-di-tert-butyl-4-hydroxyhydrocinnamate) which are available from Ciba Specialty Chemicals of Tarrytown, N.Y. In addition, other stabilizers or additives which are compatible with the film forming process, stretching and any subsequent lamination steps, may also be employed with the present invention. For example, additional additives may be added to impart desired characteristics to the film such as, for example, melt stabilizers, processing stabilizers, heat stabilizers, light stabilizers, heat aging stabilizers and other additives known to those skilled in the art. Generally, phosphite stabilizers (i.e. IRGAFOS 168 available from Ciba Specialty Chemicals of Tarrytown, N.Y. and DOVERPHOS available from Dover Chemical Corp. of Dover, Ohio) are good melt stabilizers whereas hindered amine stabilizers (i.e. CHIMASSORB 944 and 119 available from Ciba Specialty Chemicals of Tarrytown, N.Y.) are good heat and light stabilizers. Packages of one or more of the above stabilizers are commercially available such as B900 available from Ciba Specialty Chemicals. Desirably about 100 to 2000 ppm of the stabilizers are added to the base polymer(s) prior to extrusion (Parts per million is in reference to the entire weight of the filled-film).

Desirably, a concentrate of "filled polymer" (carrier resin and filler) is made with the filler and the semi-crystalline carrier polyolefin in the range of between about 60–85 percent by weight filler, more desirably 70–85 percent by weight filler. It is also desirable to reduce the amount of the semi-crystalline polymer in the final composition so as to have the least impact on the elastic performance of the elastomeric polymer phase. The elastic polymer is blended with the filled polymer concentrate resin prior to introduction into the film screw extruder in a blending station as a "letdown" resin. The concentration of the thermoplastic elastomer is then generally determined by the desired filler level in the final composition. The level of filler will necessarily affect breathability as well as elastic properties of the film. In one embodiment it is desirable for the filler to be present in the filled polymer in an amount of greater than 80 weight percent, such that the film demonstrates the desired properties which are described below.

As an example, the filler may be present in a film configuration of between about 25–65 weight percent, the elastomer may be present in a range between about 15–60 weight percent, and the semi-crystalline polymer may be present in a range of between about 5–30 weight percent.

It is desirable for the purposes of this invention, to limit as much as possible the semi-crystalline polymer to the surface of the filler, so as not to fully compound the carrier resin polymer or filler throughout the elastic polymer blend, thereby limiting the mixing of the two polymers. The elastic polymer is then generally in a continuous phase throughout the film, maximizing the elastic performance.

The film is then laminated to one or more sheet material layers as part of a multi-layered laminate. For instance, the film can be laminated to one or more nonwoven sheet materials or woven webs or scrims. In one embodiment, the film is laminated to a spunbond web. Such spunbond may be of a polyolefin material such as polypropylene, polyethylene, copolymers thereof and blends thereof. Such spunbond web can be of a single polymer component, or alternatively of a bicomponen/conjugate arrangement. Desirably, such spunbond web has a basis weight of between about 10 and 50 gsm. Alternatively, such film can be laminated to a coform, meltblown, or bonded carded web. The film may be laminated to additional sheet materials by adhesive, thermal calendaring, extrusion coating or ultrasonic bonding methods. In some instances, the layer that is laminated to the film may provide support to the film, and may be fairly characterized as a support layer. In other instances, such additional layer may provide other types of functionality, such as an improved hand.

Figure 2:
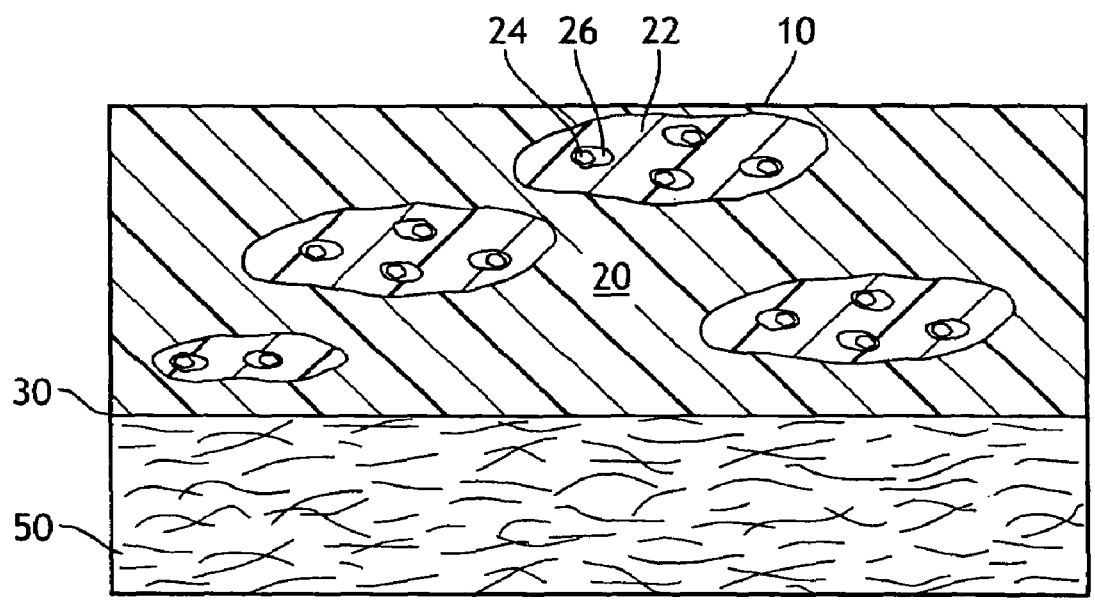
FIG. 2 is a cross-sectional view of a film/laminate made in accordance with the invention.

As can be seen in FIG. 2, a film laminate of the current invention is illustrated having a single layer breathable elastic film 10 and at least one additional attached layer such as a nonwoven layer 50. Such nonwoven layer is attached by for instance an adhesive application 30.

Figure 3:
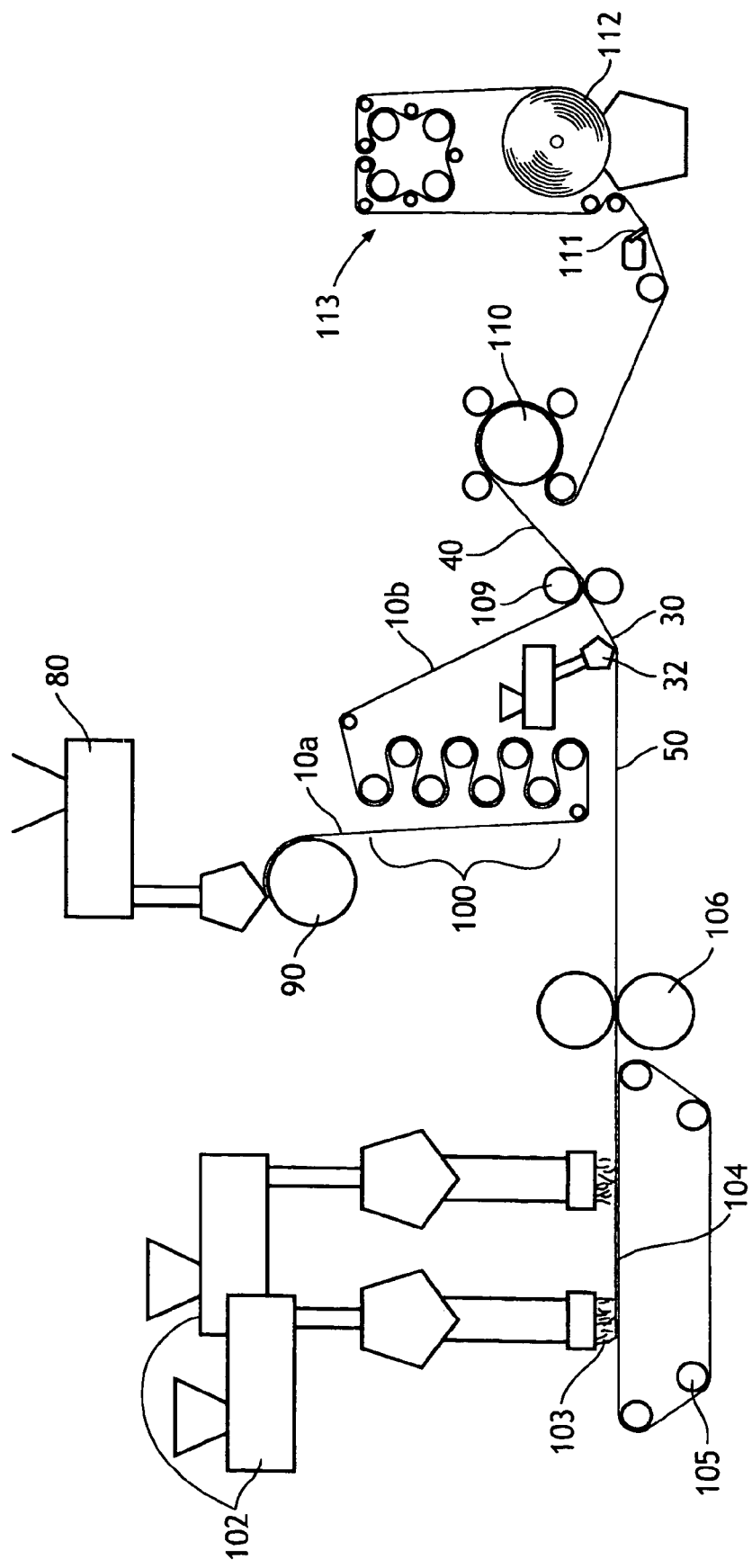
FIG. 3 is a schematic of a process used to make a film and laminate in accordance with the invention.

Process:

A process for forming the breathable, elastic film 10 and film laminate 40 is shown in FIG. 3 of the drawings. However, before the film is manufactured, the raw materials, i.e. the semi-crystalline carrier polymer(s) and filler must first be compounded such as through the following process. The filler and semi-crystalline polymer raw materials are added into a hopper of a twin screw extruder or high intensity mixer, (both available from Farrel Corporation, of Ansonia, Conn.) and are dispersively mixed in the melt, by the action of the intermeshing rotating screws or rotors. The resulting mixture is pelletized and is referred to herein as the filler concentrate or filler concentrate compound. The filler concentrate compound and the thermoplastic elastomer resin are then desirably processed in a film process by means of a single, barrier screw extruder, followed by a melt pump feeding a film die. Referring again to FIG. 3, the polymer materials are placed in an extruder 80 apparatus and then cast or blown into a film.

It should therefore be recognized that the carrier, filler and elastomer materials are not all fully compounded together in one step, rather it is a separate step process that accomplishes the compounding, so as to maintain the carrier resin in some association with the filler.

A precursor film 10a is then extruded (at a temperature range of between about 380–440° F., Examples in the range of 400–420° F.) for instance, onto a casting roll 90, which may be smooth or patterned. The term "precursor" film shall be used to refer to the film prior to being made breathable, such as by being run through a machine direction orienter. The flow out of the extruder die is immediately cooled on the casting roll 90. A vacuum box (not shown) may be situated adjacent the casting roll in order to create a vacuum along the surface of the roll to help maintain the precursor film 10a lying close to the surface of the roll. Additionally, air knives or electrostatic pinners (not shown) may assist in forcing the precursor film 10a to the casting roll surface as it moves around the spinning roll. An air knife is a device known in the art which focuses a stream of air at a very high flow rate to the edges of the extruded polymer composition material. The precursor film 10a (prior to run through the MDO) is desirably between about 20 and 100 microns in thickness, and has an overall basis weight of between about 30 gsm and 100 gsm. In one embodiment the basis weight is between about 50–75 gsm. Following stretching in a stretching apparatus, the basis weight of the film is between about 10 and 60 gsm, desirably between about 15 and 60 gsm.

As previously stated, the precursor film 10a is subjected to further processing to make it breathable. Therefore, from the extrusion apparatus 80, and casting roll 90, the precursor film 10a is directed to a film stretching unit 100, such as a machine direction orienter or "MDO" which is a commercially available device from vendors such as the Marshall and Williams Company of Providence, R.I. This apparatus may have a plurality of stretching rollers (such as for example from 5 to 8) which progressively stretch and thin the film in the machine direction, which is the direction of travel of the film through the process as shown in FIG. 3. While the MDO is illustrated with eight rolls, it should be understood that the number of rolls may be higher or lower, depending on the level of stretch that is desired and the degrees of stretching between each roll. The film can be stretched in either single or multiple discrete stretching operations. It should be noted that some of the rolls in an MDO apparatus may not be operating at progressively higher speeds. Desirably, the unstretched filled film 10a (precursor film) will be stretched from about 2 to about 5 times its original length, imparting a final stretch of between 1.5 to about 4 times of the original film length after the film is allowed to relax at the winder. In an alternative embodiment, the film may be stretched through intermeshing grooved rolls such as those described in U.S. Pat. No. 4,153,751 to Schwarz, incorporated by reference herein in its entirety.

Referring again to FIG. 3, some of the rolls of the MDO 100 may act as preheat rolls. If present, these first few rolls heat the film above room temperature (1250° F.). The progressively faster speeds of adjacent rolls in the MDO act to stretch the filled precursor film 10a. The rate at which the stretch rolls rotate determines the amount of stretch in the film and final film weight. Microvoids are formed during this stretching to render the film microporous and subsequently breathable. After stretching, the stretched film 10b may be allowed to slightly retract and/or be further heated or annealed by one or more heated rolls 113, such as by heated anneal rolls. These rolls are typically heated to about 150–220° F. to anneal the film. The film may then be cooled.

After exiting the MDO film stretching unit, the then breathable product film 10b is attached to one or more of the previously described nonwoven layers 50, such as spunbond layers, to form a multilayer film/laminate 40. Suitable laminate materials include sheet materials such as nonwoven fabrics, multi-layered nonwoven laminate fabrics, scrims, woven fabrics and other like materials. In order to achieve a laminate with improved body conformance, the fibrous layer is itself desirably an extensible fabric and even more desirably an elastic fabric. For example, tensioning a nonwoven fabric in the MD causes the fabric to "neck" or narrow in the CD and give the necked fabric CD extensibility. Examples of additional suitable extensible and/or elastic fabrics include, but are not limited to, those described in U.S. Pat. No. 4,443,513 to Meitner et al.; U.S. Pat. No. 5,116,662 to Morman et al.; U.S. Pat. No. 4,965,122 to Morman et al.; U.S. Pat. No. 5,336,545 to Morman et al.; U.S. Pat. No. 4,720,415 to Vander Wielen et al.; U.S. Pat. No. 4,789,699 to Kieffer et al.; U.S. Pat. No. 5,332,613 to Taylor et al.; U.S. Pat. No. 5,288,791 to Collier et al.; U.S. Pat. No. 4,663,220 to Wisneski et al.; and U.S. Pat. No. 5,540,976 to Shawver et al. The entire content of the aforesaid patents are incorporated herein by reference. Such necked nonwoven material may be bonded to the film of the present invention. In an alternative embodiment, a slit and necked nonwoven material may be bonded to the film of the present invention. In still a further alternative embodiment, the spunbond support layer may be stretched using a variety of methods. For instance, such material may be stretched using a tenter frame or grooved rolls from between 1.5 to 3× in the CD and then necked to the original width or to match the width of the film prior to being adhesively laminated to the film.

Nonwoven fabrics which are to be laminated to such product films 10 desirably have a basis weight between about 10 g/m$^2$ and 50 g/m$^2$ and even more desirably between about 12 g/m$^2$ and 25 g/m$^2$. In an alternative embodiment such nonwoven fabrics have a basis weight between about 15–20 g/m$^2$. As a particular example, a 20 g/m$^2$ web of polypropylene spunbond fibers can be necked a desired amount (basis weight then increases). The product film 10 would therefore be nipped (in an adhesive nip, or lamination rolls of a calender roll assembly 109) to a necked or CD stretchable spunbond nonwoven web.

The spunbond or other support layer may either be provided from a pre-formed roll, or alternatively, be manufactured in-line with the film and brought together shortly after manufacture. For instance, as is illustrated in FIG. 3, one or more spunbond extruders 102 meltspin spunbond fibers 103 onto a forming wire 104 that is part of a continuous belt arrangement. The continuous belt circulates around a series of rollers 105. A vacuum (not shown) may be utilized to maintain the fibers on the forming wire. The fibers may be compressed via compaction rolls 106. Following compaction, the spunbond or other nonwoven material layer is bonded to the product film 10. Such bonding may occur through adhesive bonding, such as through slot or spray adhesive systems, thermal bonding or other bonding means, such as ultrasonic, microwave, extrusion coating, and/or compressive force or energy. An adhesive bonding system 32 is illustrated. Such a system may be a spray or a slot coat adhesive system. Such slot coat adhesive systems are available from the Nordson Corporation, of Dawsonville, Ga. For example, an adhesive applicator die is available from Nordson under the designation BC-62 Porous Coat model. Such a die may be held on a coating stand such as the NT 1000 series coating stand. It has been found that slot coating adhesive processes provide for more uniform adhesive coverage, over a wide range of adhesive viscosities.

Examples of suitable adhesives that may be used in the practice of the invention include Rextac 2730, 2723 available from Huntsman Polymers of Houston, Tex., as well as adhesives available from Bostik Findley, Inc, of Wauwatosa, Wis., such as H9375-01. In an alternative embodiment, the film and nonwoven support layer are laminated with an adhesive such that the basis weight of the adhesive is between about 1.0 and 3.0 gsm. The type and basis weight of the adhesive used will be determined on the elastic attributes desired in the final laminate and end use. In another alternative embodiment, the adhesive is applied directly to the nonwoven layer prior to lamination with the film. In order to achieve improved drape, the adhesive may be pattern applied to the outer fibrous layer.

The film and support layer material typically enter the lamination rolls at the same rate as the film exits the MDO. Alternatively, the film is tensioned or relaxed as it is laminated to the support layer. In an alternative embodiment, bonding agents or tackifiers may be added to the film to improve adhesion of the layers. In order to achieve improved drape of the laminate, the adhesive is desirably pattern applied to one of the fabrics or applied only to the outer fibrous layer. By applying the adhesive to the outer fibrous layer, such as a nonwoven fabric, the adhesive will generally only overlie the film at fiber contact points and thus provide a laminate with improved drape and/or breathability. Additional bonding aids or tackifiers can also be used in the fibrous or other outer layer.

After bonding, the laminate 40 may be further processed. Following lamination, the multilayered laminate may be subjected to numerous post-MDO stretching manufacturing processes. For instance, such laminate may be slit and/or necked. Alternatively, the laminate may be stretched in a cross-machine direction. For instance, in one embodiment, it is desirable to stretch the film/support layer laminate in either traditional grooved rolls having peaks and valleys, or grooved rolls formed from discs along an axis.

For instance, such laminate may be coursed through a series of grooved rolls that have grooves in the CD direction. Such processing step 110 may provide additional desired attributes to the laminate 40, such as softness, without sacrificing elasticity or breathability.

Figure 9:
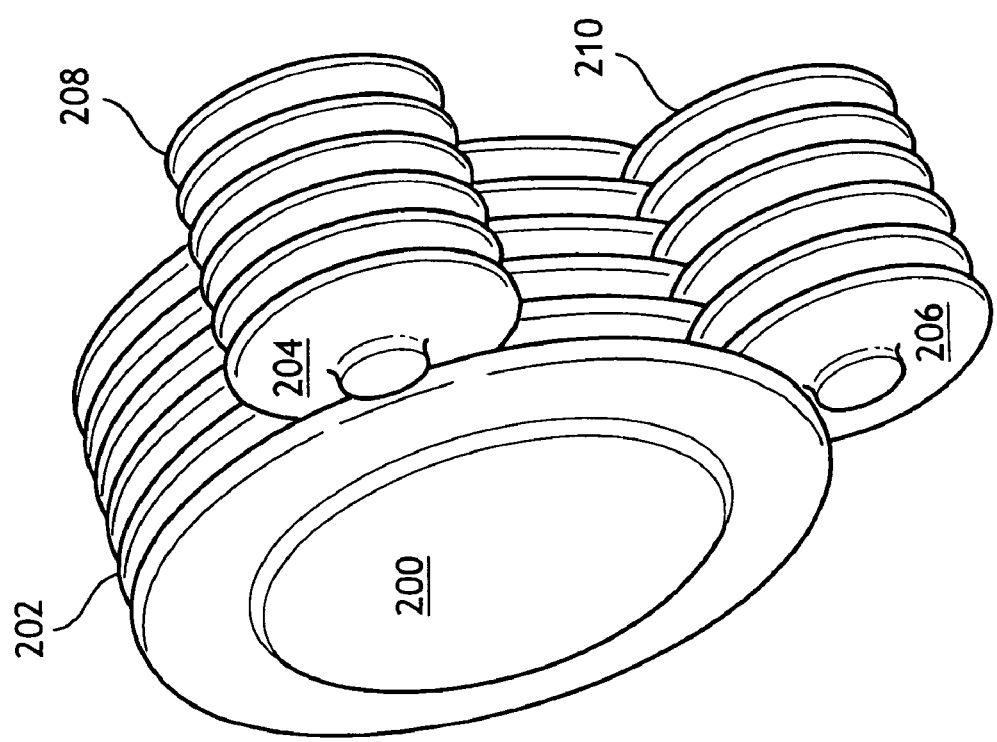
FIG. 9 is a perspective view of a grooved roll apparatus which may be used to stretch the film/nonwoven laminate or the nonwoven layer (individually) in accordance with the invention.

The groove roll arrangement of the inventive process (for both post lamination formation and pre-lamination nonwoven web processing) may be single rolls immediately adjacent one another such that the peaks of one roll lie in the valleys of an adjacent roll (as previously described), or alternatively, they be a single or main anvil roll that is encircled by smaller satellite rolls. For instance, in one embodiment, the nonwoven support layer or laminate may be coursed through a grooved roll arrangement in which a main anvil roll is encircled by one or more satellite rolls. Such an arrangement is illustrated in FIG. 9. A device for stretching such fabrics is described in US Application bearing Ser. No. PCT/U.S. Pat. No. 03/26247 titled Multiple Impact Device and Method for Treating Flexible Webs, to Robert James Gerndt et al. filed Aug. 22, 2003. Such application is incorporated by reference hereto in its entirety.

As can be seen in FIG. 9, an anvil roll includes about its periphery a series of grooves in the anvil and satellite rolls which run concentrically around the rolls and, therefore, the web is stretched in the widthwise or cross machine direction. As shown, anvil roll 200 includes grooves 202 and is positioned in working engagement with satellite rolls 204, 206, also having grooves 208 and 210, respectively. It will be apparent that the number of engaging rolls and the engagement depth of the respective rolls may be varied, and the rolls may be partially or fully grooved to provide zoned or full stretching along the roll length as desired.

Figure 10:
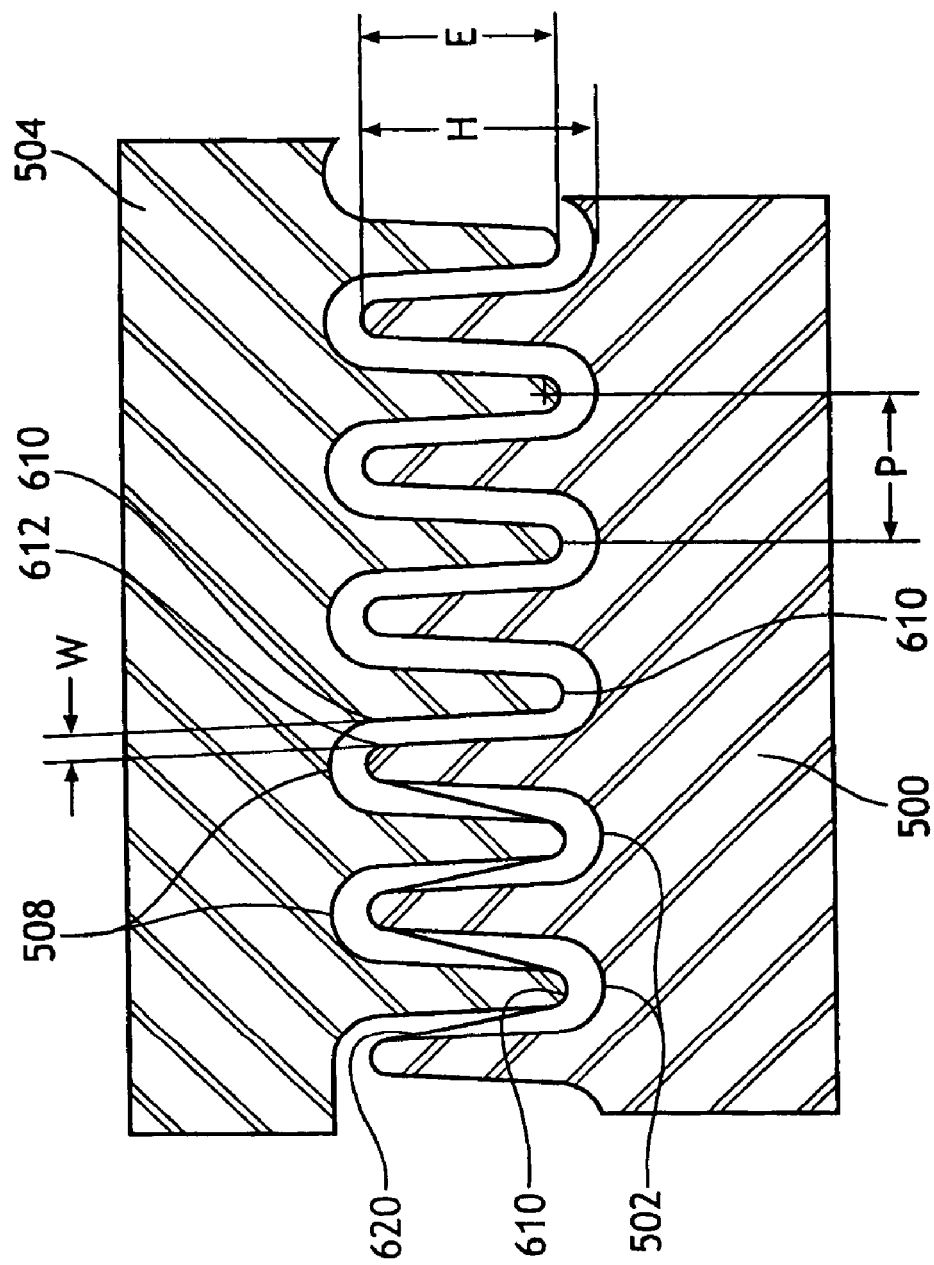
FIG. 10 is a detailed partial view of an engaged nip configuration of a grooved roll apparatus.

As seen in FIG. 10, the grooved rolls are defined by fins and channels along their surfaces. FIG. 10 is an enlarged partial cross sectional view of an engaged nip, for example, for the embodiment of FIG. 9 showing the path of web travel. While, for purposes of more clearly illustrating the nip, the path of web 620 is only shown partially across the nip, it will be apparent that the web may and will normally extend completely across the nip. As shown, the grooves 502 of anvil roll 500 intermesh or accommodate the fins 610 between the grooves 508 of satellite roll 504. The intermeshing, in this case, maintains spacing, W, between the respective groove walls 610, 612 that is wider than the thickness of web 620 with the result that the web is stretched without being compressed. As shown, H measures the fin height, and E measures the depth of engagement. The number of grooves per inch is measured by counting the number of fins, tip to tip (peak to peak), per inch along the roll.

The number of grooves may be varied widely to achieve desired results. For example, for stretching of lightweight laminates of film and nonwoven for disposable personal care product applications such as a backing/outercover component, the number of grooves useful may vary from about 3 to about 15 per inch, although greater or fewer are contemplated. For instance, in one particular embodiment, the number of grooves is between about 5 and 12 grooves per inch. In a further alternative embodiment, the number of grooves is between 5 and 10 per inch. Essentially, in one particular embodiment, the peak to peak distance of the fins may be varied from about 0.333 inch to about 0.0666 inch. In an alternative embodiment the peak to peak distance may be between about 0.200 inch to about 0.083 inch. The engagement of the fins and grooves of the grooved rolls may be from about 0 to 0.300 inch. In an alternative embodiment, the engagement of fins in grooves is between about 0.010 inch to about 0.200 inch. In another embodiment, the engagement may be between about 0.070 inch to about 0.150 inch. Desirably, in one embodiment the total stretch of the material in the CD direction is between about 2.0–2.75× and an engagement of between about 0.100 inch to about 0.150 inch (at about 8 grooves per inch). Such conditions are desirable for a prelamination stretching of a nonwoven material prior to lamination to a film. For such applications, it may be important that the compression of the material be avoided, and the shape of the intermeshing grooves may be selected for that purpose. Furthermore, the depth of engagement as the grooves intermesh may also be varied so as to achieve the desired stretch level. It is a feature of the present invention that high stretch levels may be attained in localized areas in steps of engagement that avoid single, harsh impact that might damage fragile materials.

The rolls of such groove arrangements may be constructed of steel or other materials satisfactory for the intended use conditions as will be apparent to those skilled in the art. Also, it is not necessary that the same material be used for all the rolls, and the anvil roll, for example, may be constructed of hard rubber or other more resilient material so as to impact the flexible web under less stressful conditions. The temperature of one or more of the rolls may be controlled by heating or cooling to also change the stretching conditions. In the case of laminate formation, one or more of the component layers may be introduced between the successive rolls to result in different levels of stretch applied to one or more of the component layers.

To a significant extent, the material being treated will determine the desired configuration of the equipment. For example, treatment of heavy weight materials may dictate that the spacing of the grooves be increased over those parameters for lighter weight materials. Elastic materials may also suggest that the spacing may be increased without damage to the web, however, for laminates, the less elastic component will also be a consideration. For single layer nonwoven support materials, the spacing of the grooves would likely be less than for heavyweight materials, so as not to impart damage or abrasion to the webs.

It should also be apparent to those of skill that biaxially stretching may be achieved by successive use of a machine direction stretch device and a cross machine direction stretch device or reversing this order if desired, or alternatively if further machine direction stretching is desired in addition to that previously imparted via the MDO, a grooved roll arrangement may be employed that utilized grooved rolls having their grooves from one end of the roll to the other across the width of the roll.

The satellite rolls are positioned in working engagement with the grooved surface of the anvil roll such that they are shaped and positioned to intermesh or fit within the grooves of the anvil roll. The number of satellite rolls that may be employed may be varied, and the satellite rolls are preferably adapted to be moved in and out of engagement so that the number may be readily changed as desired. The rolls are desirably driven at speeds matched to the desired effective engagement by one or more motors (not shown).

As shown in FIG. 9, anvil roll 200 is engaged by satellite rolls 204 and 206 which operate to apply a stretching force to a laminate (or nonwoven support material) as the laminate passes through the nips formed between the anvil and satellite rolls. In this case the grooves of one of the satellite rolls extend into mating grooves of the anvil roll to a lesser extent than do the grooves of the other satellite roll. In this manner, stretching forces applied to the laminate may be gradually increased so that there is a reduced tendency to tear or otherwise damage the laminate and yet stretch to a high degree. It will be apparent that varying the mating engagement of the rolls in this manner may be done with any or all of the satellite rolls and may occur in any order of increasing or decreasing engagement as desired. Following any additional post lamination treatment (as seen in FIG. 3), the laminate may be further slit, 111, annealed 113, printed, apertured and/or wound on a winder 112.

The inventive film laminate may be incorporated in numerous personal care products. For instance, such material is particularly advantageous as a stretchable outer cover for various personal care products. Additionally, such film laminate may be incorporated as a base fabric material in protective garments such as surgical or hospital drapes. In still a further alternative embodiment, such material may serve as base fabric for protective recreational covers such as car covers and the like.

Figure 4:
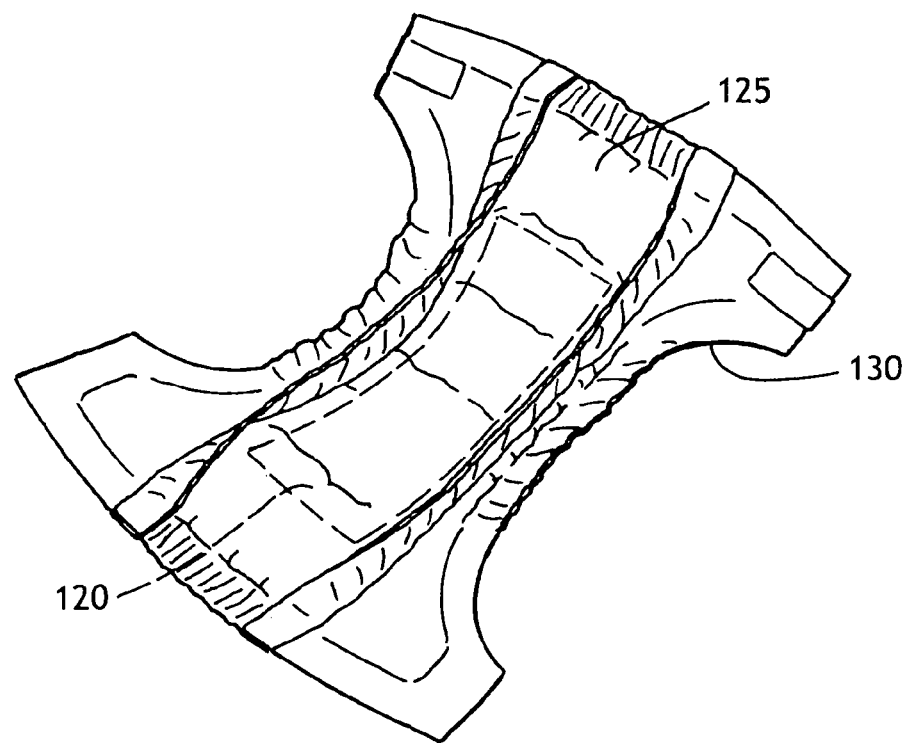
FIG. 4 is a drawing of a diaper made in accordance with the invention.

In this regard, FIG. 4 is a perspective view of an absorbent article, such as a disposable diaper of the present invention in its opened state. The surface of the diaper which contacts the wearer is facing the viewer. With reference to FIG. 4, the disposable diaper generally defines a front waist section, a rear waist section, and an intermediate section which interconnects the front and rear waist sections. The front and rear waist sections include the general portions of the article which are constructed to extend substantially over the wearer's front and rear abdominal regions, respectively, during use. The intermediate section of the article includes the general portion of the article that is constructed to extend through the wearer's crotch region between the legs.

The absorbent article includes an outer cover 130, a liquid permeable bodyside liner 125 positioned in facing relation with the outer cover, and an absorbent body 120, such as an absorbent pad, which is located between the outer cover and the bodyside liner. The outer cover in the illustrated embodiment, coincides with the length and width of the diaper. The absorbent body generally defines a length and width that are less than the length and width of the outer cover, respectively. Thus, marginal portions of the diaper, such as marginal sections of the outer cover, may extend past the terminal edges of the absorbent body. In the illustrated embodiment, for example, the outer cover extends outwardly beyond the terminal marginal edges of the absorbent body to form side margins and end margins of the diaper. The bodyside is generally coextensive with the outer cover but may optionally cover an area which is larger or smaller than the area of the outer cover, as desired.

The outer cover and bodyside liner are intended to face the garment and body of the wearer, respectively, while in use. The film laminate of the present invention may conveniently serve as the outercover in such an article, providing a barrier, an aesthetically pleasing appearance and a pleasant tactile touch.

Fastening means, such as hook and loop fasteners, may be employed to secure the diaper on a wearer. Alternatively, other fastening means, such as buttons, pins, snaps, adhesive tape fasteners, cohesives, mushroom-and-loop fasteners, or the like, may be employed. In this regard, the inventive material may be used as the loop material as part of a stretchable outercover.

The diaper may also include a surge management layer located between the bodyside liner and the absorbent body to prevent pooling of the fluid exudates and further improve the distribution of the fluid exudates within the diaper. The diaper may further include a ventilation layer (not illustrated) located between the absorbent body and the outer cover to insulate the outer cover from the absorbent body to reduce the dampness of the garment facing surface of the outer cover.

The various components of the diaper are integrally assembled together employing various types of suitable attachment means, such as adhesive, sonic bonds, thermal bonds or combinations thereof. In the shown embodiment, for example, the bodyside liner and outercover may be assembled to each other and to the absorbent body with lines of adhesive, such as a hotmelt, pressure-sensitive adhesive. Similarly, other diaper components, such as elastic members and fastening members, and surge layer may be assembled into the article by employing the above-identified attachment mechanisms. The article of the invention desirably includes the film laminate as a stretchable outer cover which encompasses a stretchable fabric layer which is operatively attached or otherwise joined to extend over a major portion of the outward surface of the article. In regions where the stretchable outercover is not affixed to non-stretchable portions of the article or otherwise restricted from extending, the stretchable outer cover can be free to advantageously expand with minimal force. In desired aspects, the outer cover can be stretchable along the longitudinal direction, lateral direction, or along a combination of both the lateral and longitudinal directions. In particular, it is desirable that the portion of the stretchable outer cover located in the waist sections be capable of extending in the lateral direction to provide improved fastening of the article about the wearers and improved coverage of the hips and buttocks of the wearer particularly in the rear waist section and enhanced breathability in the waist sections. For example, if the fasteners and or side panels are located along the side edges in the rear waist section of the diaper, at least a portion of the outercover in the rear waist section will desirably extend to provide enhanced coverage over the buttocks of the wearer in use for improved containment and aesthetics.

Moreover, it is also desirable that at least portions of the stretchable outer cover located over the absorbent body can extend during use for improved containment. For example, as the absorbent body absorbs fluid exudates and expands outwardly, the stretchable outer cover can readily elongate and extend in correspondence with the expansion of the absorbent body and/or other components of the article to provide void volume to more effectively contain the exudates. The stretchable outer cover of the present invention is desirably capable of providing a selected stretch when subjected to an applied tensile force, and the ability to retract upon removal of such applied force.

Figure 5:
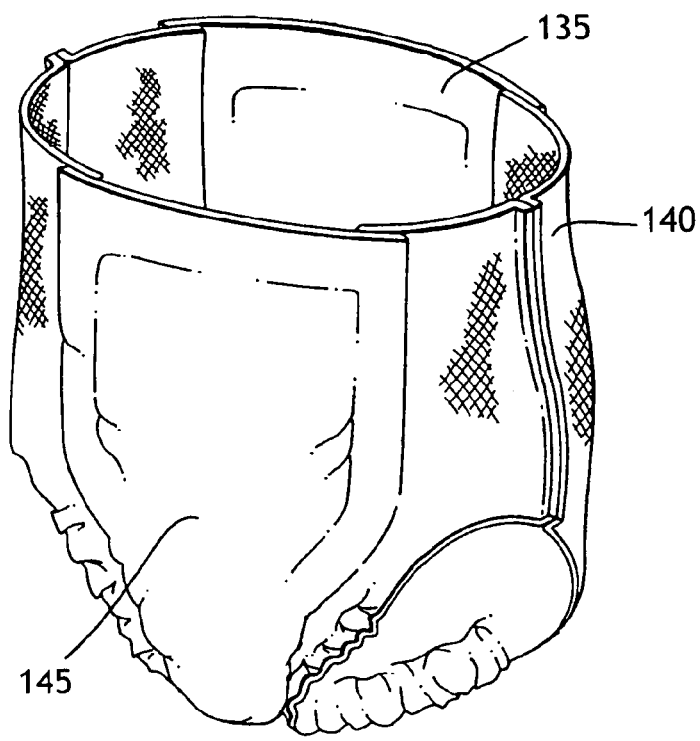
FIG. 5 is a drawing of a training pant made in accordance with the invention.
Figure 6:
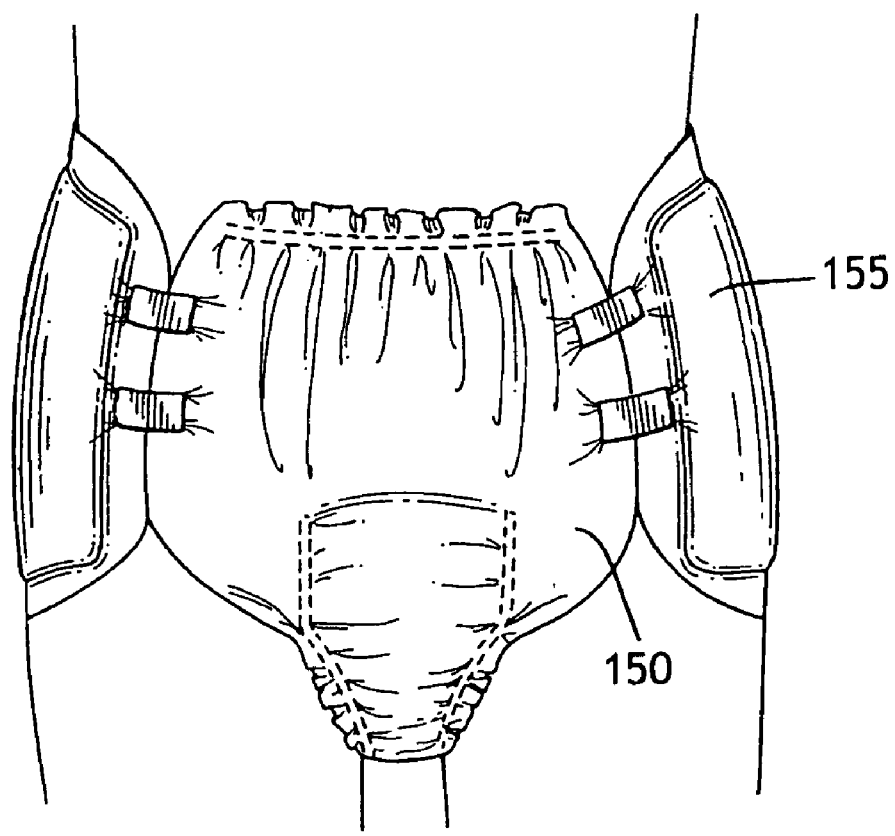
FIG. 6 is a drawing of an absorbent underpant made in accordance with the invention.
Figure 7:
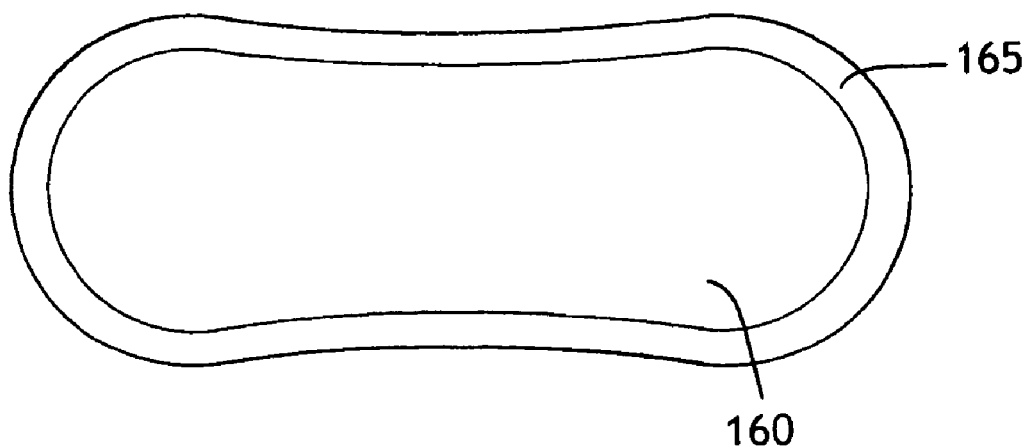
FIG. 7 is a drawing of a feminine hygiene product made in accordance with the invention.
Figure 8:
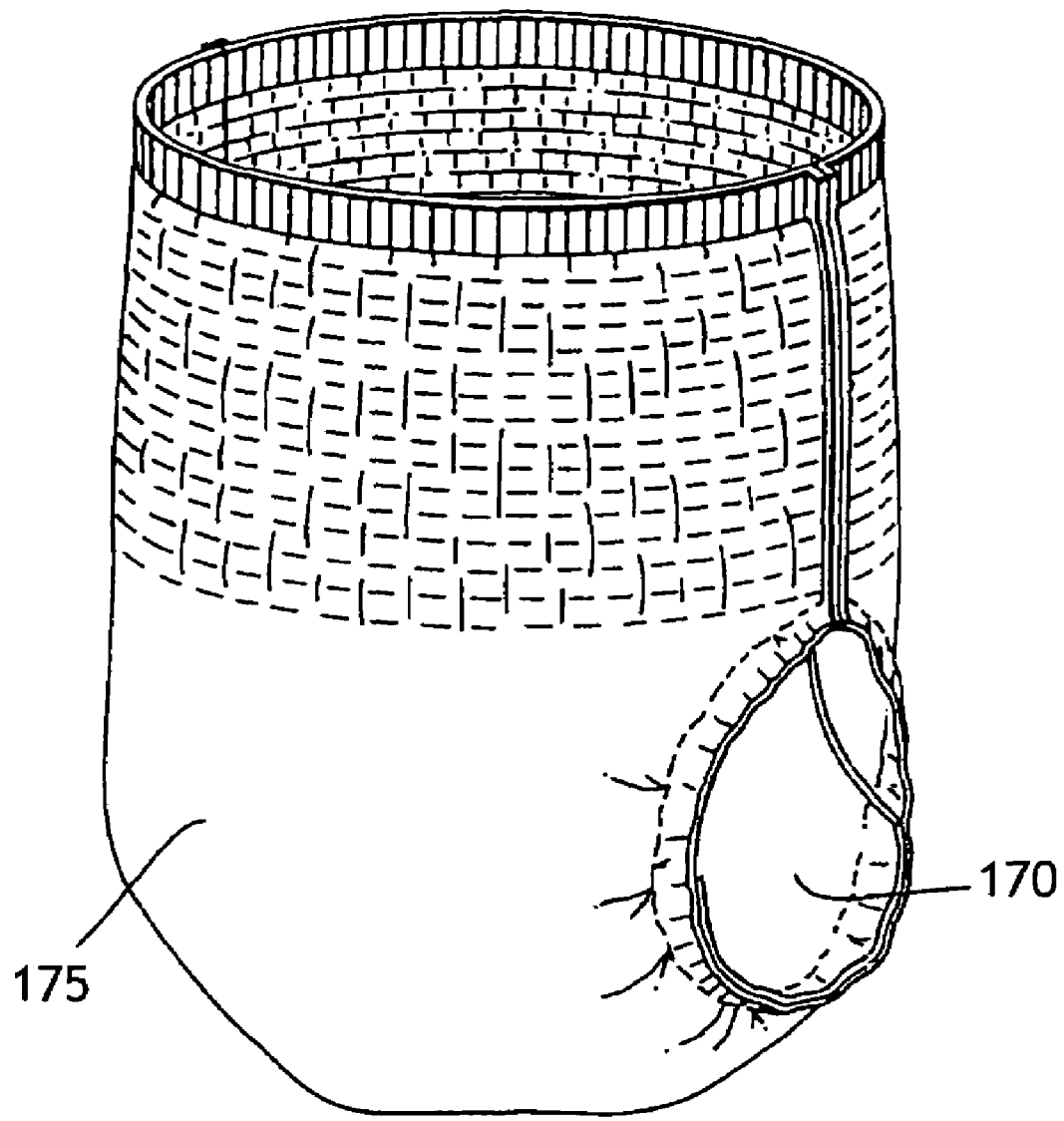
FIG. 8 is a drawing of an adult incontinence product made in accordance with the invention.

As can be seen in the various other absorbent personal care product embodiments, the inventive material may be used as an "outer cover" in a variety of product applications including a training pant, underpant, feminine care product, and adult incontinence product. For instance, as can be seen in FIG. 5, the distinctive film laminate can serve as the outercover on both the back 135 and front portions of a training pant, separated by distinct elastic side panels 140. Alternatively, the inventive material can serve as a continuous full outercover on both the front and back, as well as the side panel areas (as elastic side panels). As can be seen in FIG. 6, the distinctive film laminate can serve as an outercover in an underpant, such as either 150 or 155. As can be seen in FIG. 7, the distinctive film laminate can serve as an outercover/backsheet 165 in a feminine care pantiliner 160. As can be seen in FIG. 8, the distinctive film laminate can serve in an adult incontinence product as an outercover 175. Additionally such film laminate may serve as a sanitary napkin coversheet or a diaper liner, or further processed such by being apertured and the like, before being used as base materials in such products or product applications.

A series of examples were developed to demonstrate and distinguish the attributes of the present invention. Such Examples are not presented to be limiting, but in order to demonstrate various attributes of the inventive material.

Examples Pertaining to Film Component Only

EXAMPLE 1

In Example 1 an inventive film was created. The film layer contained calcium carbonate filler dispersed in a carrier resin. The calcium carbonate, was available from OMYA, Inc., North America of Proctor, Vt. under the designation OMYACARB® 2 SS T had an average particle size of 2 micron, top cut of 8–10 microns and about 1% stearic acid coating. The calcium carbonate (75%) filler and carrier resin (25%), Dowlex 2517 LLDPE (melt index of 25 and density of 0.917 g/cc) formed the filler concentrate compound that was then blended in a single screw conventional extruder with 33% of Septon 2004 SEPS triblock thermoplastic elastomer letdown resin to provide a final calcium carbonate concentration of 50.25% by weight. The Dowlex® polymer is available from Dow Chemical U.S.A. of Midland, Mich. The Septon polymer is available from Septon Company of America of Pasadena, Tex.

This formulation was formed into a film by casting onto a chill roll set to 104° F. at an unstretched basis weight of 64 gsm. The film was stretched 3.6 times its original length using a machine direction orienter (MDO), then retracted 35% to a stretched basis weight of 33.9 gsm. As used herein, reference to stretching the film 3.6 times means that the film which, for example, had an initial length of 1 meter if stretched 3.6 times would have a final length of 3.6 meters. The film was heated to a temperature of 125° F. and it was run through the MDO at a line speed of 492 feet per minute to provide the desired stretch. The film was then annealed at a temperature of 160–180° F. across multiple rolls.

EXAMPLE 2

In Example 2 a film similar to the film of Example 1 but with 30% of Septon 2004 SEPS triblock thermoplastic elastomer letdown resin was formulated to provide a final calcium carbonate filler concentration of 52.5% by weight.

This formulation was formed into a film by casting onto a chill roll set to 99° F. at an unstretched basis weight of 64.4 gsm. The film was stretched 3.6 times its original length using a machine direction orienter (MDO), then retracted 15% to a stretched basis weight of 30.6 gsm. The film was heated to a temperature of 125° F. and was run through the MDO at a line speed of 472 feet per minute to provide the desired level of stretch. The film was then annealed at temperatures of between 160–200° F. across multiple rolls.

EXAMPLE 3

In Example 3 a film similar to the film of Example 1 was formulated, but with 40% of Septon 2004 SEPS triblock thermoplastic elastomer letdown resin to provide a final calcium carbonate filler concentration of 45% by weight.

This formulation was formed into a film by casting onto a chill roll set to 99° F. at an unstretched basis weight of 51 gsm. The film was stretched 3.6 times its original length using a machine direction orienter (MDO) to a stretched basis weight of 40 gsm. The film was heated to a temperature of 125° F. and it was run through the MDO at a line speed of 450 feet per minute to provide the desired stretch. The film was then annealed at a temperature of 180° F. across multiple rolls. A laminate with this film will demonstrate both MD/CD stretch.

EXAMPLE 4

In Example 4 a film similar to the film of Example 1 was formulated, except the calcium carbonate compound filler concentration was 82% with carrier resin DNDA-1082 LLDPE (melt index of 155 and density of 0.933 g/cc) also from Dow Chemical U.S.A. This compound was then blended in a single screw conventional extruder with 36.5% of Septon 2004 SEPS triblock thermoplastic elastomer letdown resin to provide a final calcium carbonate concentration of 52% by weight.

This formulation was formed into a film by casting onto a chill roll set to 120° F. at an unstretched basis weight of 64.4 gsm. The film was stretched 3.6 times its original length using a machine direction orienter (MDO), then retracted 33% to a stretched basis weight of 34 gsm. The film was heated to a temperature of 125° F. and it was run through the MDO at a line speed of 576 feet per minute to deliver the desired stretch. The film was then annealed at a temperature of between 170–200° F. across multiple rolls.

COMPARATIVE EXAMPLE 1

Resulting Film not Breathable

In comparative example 1 a film similar to the film of Example 1 was formulated, except the calcium carbonate compound concentration was 75% with a carrier resin Affinity 8185 (melt index of 30 and density of 0.885 g/cc) also from Dow Chemical U.S.A. This compound was then blended in a single screw conventional extruder with 33% of Septon 2004 SEPS triblock thermoplastic elastomer letdown resin to provide a final calcium carbonate concentration of 50.25% by weight.

This formulation was formed into a film by casting onto a chill roll set to 100° F. at an unstretched basis weight of 57.5 gsm. The film was stretched 3.6 times its original length using a machine direction orienter (MDO), then retracted 36% to a stretched basis weight of 40 gsm. The film was heated to a temperature of 125° F. and it was run through the MDO at a line speed of 445 feet per minute to impart the desired stretch. The film was then annealed at a temperature of between 150–180° F. across multiple rolls.

COMPARATIVE EXAMPLE 2

Letdown Resin not an Elastomer, Resulting Film not Elastic

In comparative example 2, a film similar to the film of Example 1 was formulated, except the calcium carbonate compound concentration was 75% with the carrier resin Dowlex 2517 (melt index of 25 and density of 0.917 g/cc). This compound was then blended in a single screw conventional extruder with 33% of Dowlex 2047AC (2.3Ml 0.917 g/cc) LLDPE also from Dow Chemical U.S.A, letdown resin to provide a final calcium carbonate concentration of 50.25% by weight.

This formulation was formed into a film by casting onto a chill roll set to 102° F. at an unstretched basis weight of 45 gsm. The film was stretched 3.6 times its original length using a machine direction orienter (MDO), then retracted 36% to a stretched basis weight of 25 gsm. The film was heated to a temperature of 125° F. and it was run through the MDO at a line speed of 486 feet per minute to impart the desired stretch. The film was then annealed at a temperature of between 160–180° F. across multiple rolls.

The following Table 1 summarizes the various tests performed on the materials in accordance with the previously described test methods.

TABLE 1

| 70% Elongation and 2 cycle | Mocon g/m²/ 24 hr | 1st Load @ 50% up/gf | 1st Load @ 50% dn/gf | 2nd Load @ 50% up/gf | 2nd Load @ 50% dn/gf | Load Loss % | % Set |
|---|---|---|---|---|---|---|---|
| Example 1 | 856 | 275 | 182 | 233 | 175 | 36.1 | 8.5 |
| Example 2 | 4978 | 246 | 145 | 204 | 138 | 44.0 | 13.3 |
| Example 3 | 251 | 167 | 117 | 144 | 113 | 32.4 | 12.5 |
| Example 4 | 1490 | 213 | 143 | 183 | 137 | 35.7 | 12.5 |
| Comparative Example 1 | 85 | 274 | 169 | 219 | 160 | 42 | 15.2 |
| Comparative Example 2 | 5993 | 406 | 67 | 291 | 55 | 86 | 44.1 |

For the purposes of the Tables, the abbreviation up/gf refers to the extension/elongation (up) tension on the cycle test in grams-force, and the abbreviation dn/gf refers to "retraction" (down) tension on the cycle test in grams-force. Elastic-type Testing was done in the CD direction (unless otherwise noted), and therefore values reflect CD direction elastic performance. It is desirable that such films demonstrate load loss values less than about 50 percent. More desirably, such films should demonstrate a load loss of less than about 45 percent. Still even more desirably, such films should demonstrate a load loss of less than about 35 percent. Each of the load loss values are at 50 percent elongation in accordance with the described cycle test. Load loss is expressed in a percentage, as is set.

Examples Pertaining to Film/Nonwoven Laminates Only:

EXAMPLE 5

In Example 5, a film/nonwoven laminate was produced. The film layer filler concentrate was comprised of 75% calcium carbonate which was dispersed into a polymeric carrier resin. The calcium carbonate, available from Omya, Inc. North America of Proctor, Vt., and designated as 2SST, has an average particle size of 2 microns with a top cut of 8–10 microns and a coating of approximately 1% stearic acid. The polymeric carrier resin which comprises 25% of the blend was a Dowlex® 2517 LLDPE resin supplied by Dow Chemical U.S.A. of Midland Mich. Dowlex® 2517 has a density of 0.917 g/cc and a melt index of 25. The 75/25 blend of calcium carbonate and LLPE resin was subsequently blended with 33% of Septon 2004® which is a SEPS based styrenic block copolymer to provide a final calcium carbonate concentration of 50.25% by weight. The Septon® resin is available from Septon Company of America of Pasadena, Tex.

The formulation was formed into a film by casting onto a chill roll set to 38° C. (100° F.) at an unstretched basis weight of approximately 64 gsm. The casting speed was 125 ft/minute. The film was heated to a temperature of 125° F., stretched 3.6 times its original length using a machine direction orientor at a line speed of 445 feet per minute. The film was retracted 30% resulting in a stretched basis weight of approximately 33 gsm. As used herein, stretching 3.6 times means that a film which, for example, had an initial length of 1 meter if stretched 3.6 times would have a final length of 3.6 meters. The film was then annealed at a temperature of 150° F. across multiple rolls at a line speed of 330 feet per minute.

The fibrous nonwoven web was a 20 gsm spunbond web produced by BBA with the trade name of Sofspan 120. Lamination of the film and nonwoven layer was accomplished using adhesive lamination with a slot die coater. Rextac® 2730 adhesive, produced by Huntsman Polymers corporation in Odessa, Tex., was melted to a temperature of 177° C. (350° F.) and applied to the spunbond sheet with an add-on level of 1.77 gsm. The adhesively bonded film/nonwoven laminate was then introduced into the nip of two intermeshing grooved steel rolls at a velocity of 325 feet per minute. Each roll (2 total) had a width (end to end) of 24 inches with the diameter of the rolls about 10.250 inches. Each groove was formed with a depth of 0.200 inch and a peak to peak distance of 0.125 inch, resulting in a maximum draw of 3.4×. In this sample the laminate was heated to a temperature of 130° F. and stretched to 2.74× in the cross direction by adjusting the engagement of the two rolls to 0.150" at 8 grooves per inch configuration.

The produced laminate was minimally retracted 1% in the machine direction between the lamination unit and first roll in the annealing unit maintaining its width. The laminate was then annealed and cooled using 4 temperature controlled rolls. The laminate with the film side in contact with the rolls was heated at 82° C. (180° F.) over two rolls and then cooled at 16° C. (60° F.) over the next two rolls to set the final cross direction stretch material properties. Finally the laminate was transferred with 3% retraction to the winder for a final basis weight of 58 gsm.

EXAMPLE 6

In Example 6, another film/nonwoven laminate was produced. The film layer was the same as used in Example 5. The fibrous nonwoven web used was a 14.6 gsm spunbond web produced using Exxon 3155 polypropylene produced by ExxonMobil Chemical Company. The spunbond web was made generally as described in Haynes et. al. US patent application publication US 2002-0117770 incorporated by reference in its entirety, and bonded using a bond pattern of HDD (high density diamond) having a bond area in the range of from about 16% to about 18% and about 460 bonds per square inch.

Lamination of the two layers was performed in the same manner and under the same conditions as in Example 5. The grooved roll processing and annealing of the laminate was also performed in the same manner and under the same conditions as Example 5.

EXAMPLE 7

In Example 7, another film/nonwoven laminate was produced. The film and nonwoven layers were the same as used in Example 5. Lamination of the two layers was performed in the same manner and under the same conditions as in Example 6 but using a different adhesive. Findley-Bostik hot melt adhesive H9375-01 was used to produce the laminate. The adhesive was heated to a temperature of 165° C. (330° F.) and applied at an add-on level of 1.77 gsm.

The grooved roll processing and annealing of the laminate was also performed in the same manner and under the same conditions as Example 6 with the exception of the grooved roll engagement which was decreased to 3.175 mm (0.125") at 8 grooves per inch engagement.

EXAMPLE 8

In Example 8, another film/nonwoven laminate was produced. The film layer was the same as that used in Example 5. The nonwoven layer was a 18.7 gsm spunbond web produced using 3155 polypropylene and necked 15% to a final basis weight of approximately 20 gsm. The spunbond web was thermally bonded using a HP (Hansen-Pennings) bond pattern having a bond area in the range of from about 31% to about 35% and about 204 bonds per square inch.

The lamination of the film and nonwoven layers was performed in the same manner and under the same conditions as in Example 5. The grooved roll processing and annealing of the laminate was also performed in the same manner and under the same conditions as Example 6.

EXAMPLE 9

In Example 9, another film/nonwoven laminate was produced. The film layer was the same as that used in Example 5. The nonwoven layer was a 17 gsm spunbond web produced using 3155 polypropylene and necked 50% to a final basis weight of approximately 21.4 gsm. The spunbond web was thermally bonded using a WW (wire weave) pattern having a bond area in the range of from about 15% to about 21% and about 302 bonds per square inch.

The lamination of the film and nonwoven layers was performed in the same manner and under the same conditions as in Example 5. The film/nonwoven laminate was not subjected to grooved roll treatment. The annealing was performed in the same manner and under the same conditions as Example 5 with the exception of a 5% retraction from the laminator to the annealing unit and a 5% draw from the annealing unit to the winder.

EXAMPLE 10

In Example 10, another film/nonwoven laminate was produced. The film layer was the same as that used in Example 5, except that the Septon®2004 resin was replaced with a 1:2.3 blend of Kraton®1652 and Kraton®1657. Both Kraton® resins are styrenic block copolymers produced by Kraton™ Polymers of Houston, Tex. The fibrous nonwoven web was the same as used in Example 5.

The lamination of the film and nonwoven layers was performed in the same manner and under the same conditions as in Example 5.

The grooved roll processing and annealing of the laminate was also performed in the same manner and under the same conditions as Example 5 with the exception that there was no retraction from the laminator to the annealing unit and 3% retraction from the annealing unit to the winder.

The Test Data for Laminate Examples 5–10 Above is Described in the Following Table 2.

TABLE 2

| 70% Elongation and 2 cycle | Mocon g/m²/24 hr | 1st Load @ 50% up/gf | 1st Load @ 50% dn/gf | 2nd Load @ 50% dn/gf | Load Loss % | % Set |
|---|---|---|---|---|---|---|
| Example 5 | 2410 | 225 | 122 | 115 | 49 | 17 |
| Example 6 | 2200 | 244 | 123 | 117 | 52 | 16 |
| Example 7 | 2156 | 417 | 135 | 127 | 69.5 | 18.9 |
| Example 8 | 2334 | 468 | 136 | 127 | 73 | 17 |
| Example 9 | 1395 | 566 | 184 | 169 | 70.2 | 18.4 |
| Example 10 | N/A | 278 | 139 | 132 | 52.6 | 19.1 |

Therefore, it is desirable for laminates to demonstrate a load loss of less than about 75 percent. In still a further alternative embodiment, it is desirable for laminates to demonstrate a load loss of less than about 70 percent. In still a further alternative embodiment, it is desirable for laminates to demonstrate a load loss of less than about 65 percent. In still a further alternative embodiment, it is desirable for laminates to demonstrate a load loss of less than about 60 percent. In still a further alternative embodiment, it is desirable for laminates to demonstrate a load loss of less than about 55 percent.

Therefore, it is desirable for laminates to demonstrate a percent set of less than about 25 percent. In still a further alternative embodiment, it is desirable for laminates to demonstrate a percent set of less than about 20 percent. In still a further alternative embodiment, it is desirable for laminates to demonstrate a percent set of less than about 15 percent.

Examples of Laminates Made Utilizing Satellite Grooved Roll Arrangement

EXAMPLE 11

In Example 11 a film/nonwoven laminate was created. The film layer was comprised of a filler concentrate of 75% calcium carbonate dispersed in a carrier resin. The calcium carbonate, available from OMYA, Inc., North America of Proctor, Vt. as designated OMYACARB® 2 SS T has an average particle size of 2 micron, top cut of 8–10 microns and a coating of 1% stearic acid. The calcium carbonate (75%) and carrier resin (25%), Dowlex 2517 LLDPE (melt index of 25 and density of 0.917 g/cc) concentrate was then blended in a single screw conventional extruder with 33% of Septon 2004 SEPS triblock thermoplastic elastomer letdown resin to provide a final calcium carbonate concentration of 50.25% by weight. The Dowlex® polymer is available from Dow Chemical U.S.A. of Midland, Mich. The Septon polymer is available from Septon Company of America of Pasadena, Tex.

This formulation was formed into a film by casting (at same speed as previously described) onto a chill roll set to 38° C. (100° F.) at an unstretched basis weight of 63 gsm. The film was heated to a temperature of 52° C. (125° F.) and it was run through the MDO at a line speed of 464 ft/m to stretch the film 3.6 times its original length. The film was then retracted 35% to a stretched basis weight of 33.9 gsm. As used herein, reference to stretching the film 3.6 times means that a film which, for example, had an initial length of 1 meter if stretched 3.6 times would have a final length of 3.6 meters. The film was then annealed at a temperature of 71° C. (160° F.) across multiple rolls at a line speed of 103.6 meters/min (340 ft/m).

The fibrous nonwoven web of the laminate was a 0.45 osy spunbond web made with Exxon 3155 polypropylene, produced by ExxonMobil Corporation, which was made generally as described in US Published Patent Application US 2002-0117770 to Haynes et al., incorporated herein by reference in its entirety. The web was bonded using a wire weave bond pattern, looking as the name suggests, e.g. like a window screen and having a bond area in the range of from about 15% to about 20% and about 302 bonds per square inch.

The fibrous nonwoven web was introduced into four nips of intermeshing grooved steel rolls set up in a satellite configuration at a velocity of 103.6 meters/min (340 ft/m), as generally illustrated in FIG. 9 with the grooves in the satellite and anvil rolls being concentric. However, it should be noted that the roll configuration included four satellite rolls rather than the two illustrated. Each roll had a width (end to end) of about 66 cm (26") with the diameter of the satellite groove rolls about 27 cm (10.6") and the diameter of the main center groove roll about 45 cm (17.85"). Each groove was formed with a depth of 0.51 cm (0.200") and with a peak to peak distance of 0.31 cm (0.125") resulting in a maximum draw ratio of 3.4×. In this sample the spunbond was stretched to a draw of 2.24× or 124% in the cross direction (CD). The fibrous nonwoven web was heated to a temperature of 110° C. (230° F.) while it passed subsequently through the four temperature controlled nips between grooved rolls set to intermeshing engagements of 1.27 mm (0.050") in nip # 1, 1.905 mm (0.075") in nip # 2, 2.54 mm (0.100") in nip # 3 and 3.75 mm (0.125") in nip # 4. The spunbond was drawn 8% in the machine direction between the satellite groove roll unit and the lamination unit causing the CD width to be maintained (even though it had been stretched in the CD by the grooved rolls) to its original width of 53.34 cm (21 inches).

Lamination of the two layers was effected using adhesive lamination with a melt spray adhesive die. Rextac 2730 APAO based adhesive, produced by Huntsman Polymers Corporation in Odessa, Tex., was melted to a temperature of 177° C. (350° F.) and applied to the spunbond sheet with an add-on level of 1.5 gsm. The stretched spunbond web and film were then joined together by going over an idler roll providing sufficient pressure to join the materials, and at a speed of about 110.6 meters/min (363 ft/m), and the previously described 8% draw from the groove roll unit.

The laminate was then minimally retracted 2% in the machine direction between the lamination unit and the first roll in an annealing unit, maintaining its width to 53.34 cm (21 inches). The laminate was then annealed and cooled using 4 temperature control rolls. The laminate with the film side in contact with the rolls was heated at 82° C. (180° F.) over two rolls and then cooled at 16° C. (60° F.) over the next two rolls to set the final CD stretch material properties. Finally the material was carried with minimal retraction to the winder for a final basis weight of 48 gsm. The Mocon value for this sample was 2291 g/m$^2$/24 hr.

The remaining test data for this sample is reflected in the following Table 3.

| 70% 2 cycle | 1$^{st}$ Load @ 50% up/gf | 1$^{st}$ Load @ 50% dn/gf | 2$^{nd}$ Load @ 50% up/gf | 2$^{nd}$ Load @ 50% dn/gf | Load Loss % | % Set |
|---|---|---|---|---|---|---|
| Example 11 CD Properties | 287 | 140 | 199 | 133 | 53 | 11.8 |

EXAMPLE 12

MD/CD Stretch Laminate for Use as Outercover Material

In the laminate of Example 12, a film similar to the film of Example 11, but with 40% of Septon 2004 SEPS triblock thermoplastic elastomer letdown resin to provide a final calcium carbonate concentration of 45% by weight was cast onto a chill roll set to 38° C.(100° F.) at an unstretched basis weight of 51 gsm at 124 ft/min. The film was heated to a temperature of 125° F., stretched 3.6 times its original length using a machine direction orienter (MDO) at a maximum line speed of 450 feet per minute to stretch the film. The film was then laminated using adhesive with a slot die coater to a fibrous nonwoven web: 0.6 osy Sofspan 120 spunbond web produced by BBA Nonwovens of Simpsonville, S.C. USA, using a Findley H 9375-01 adhesive, produced and available from Bostik Findley, melted to a temperature of 160° C. (320° F.) and applied to the spunbond sheet with an add-on level of 1.5 gsm. The spunbond and film webs were then joined together by going through a low pressure combining nip providing sufficient pressure to join the materials at a speed of about 452 ft/min. The laminate was cross directionally stretched through a single nip, intermeshing grooved steel roll set up (8 groove/inch) at 426 ft/min, ambient temperature, having a 0.150" engagement (2.74× stretch). The resulting laminate was then retracted and annealed with the film side in contact with two heated rolls at 82° C. (180° F.) and then cooled at 16° C. (60° F.) over the two rolls at 250 ft/min outgoing speed to set the final cross direction (CD) and machine direction (MD) stretch material properties and to provide a final basis weight of 75 gsm. The material demonstrated the properties of Table 4 below. Additionally, the material demonstrated a breathability in the Mocon test the same as that for film Example 3 above.

TABLE 4

| Example 12 "100% 2cycle" | 1$^{st}$ Load @ 50% up/gf | 1$^{st}$ Load @ 50% dn/gf | 2$^{nd}$ Load @ 50% up/gf | 2$^{nd}$ Load @ 50% dn/gf | Load Loss | % Set |
|---|---|---|---|---|---|---|
| CD properties | 293 | 102 | 181 | 95 | 58.0 | 25.0 |
| MD properties | 344 | 228 | 383 | 216 | 64.8 | 17.8 |

It should be recognized that for the above material the predefined elongation was 100%, rather than the 70% which had been used in earlier material sample testing. However, as with the previous examples, the tension values (various loads) were measured at the 50% level.

A filled breathable elastic film laminate is therefore provided that provides elasticity without sacrificing breathability. Such elasticity is not compromised by the use of filler to create micropores. Additionally, the use of grooved roll post film formation processing provides improved hand and or, nonwoven stretch/extensibility properties without sacrificing the elastic properties of the underlying elastic film. Further, the addition of grooved roll processing to a nonwoven support layer sheet prior to laminate formation with a film, provides greater elasticity to a formed laminate. Such laminates demonstrate improved tactile and visual aesthetics and fasten anywhere hook engagement. Such materials also demonstrated breathability, liquid barrier properties and extensibility with recovery.

What is claimed is:

1. A method for forming an elastic, breathable film/nonwoven layer laminate comprising the steps of:
   a) filling a semi-crystalline, predominantly linear polymer with a filler to form a filled polymer such that said filled polymer contains at least 60 percent by weight filler, wherein said semi-crystalline polymer forms a shell around said filler particles;
   b) dry-blending a thermoplastic elastomer with the filled polymer to form a blended elastomeric composition, such that said blended elastomeric composition includes between about 25 and 70 percent filler by weight, between about 5 and 30 percent semi-crystalline polymer by weight, and between about 15 and 60 percent by weight elastomer,
   c) extruding the blended elastomeric composition into a film, wherein said filled polymer is not fully compounded throughout said blended elastomeric composition;
   d) stretching said film in a machine direction so that the film has a length that is from about 2 to about 5 times its original length, such that said film produced has a basis weight of between about 10 and 60 gsm and demonstrates a breathability greater than 100 g/m²/24 hours and a load loss value of less than 50 percent, at 50 percent elongation, when stretched to 70 percent elongation,
   a) bonding the produced film to a nonwoven layer to produce a film/nonwoven layer laminate.

2. The method of claim 1 further including the step of stretching the film/nonwoven layer laminate following lamination, in at least the cross-machine direction.

3. The method of claim 2 wherein the filled polymer contains at least 70 percent by weight filler.

4. The method of claim 1 wherein step a), the semi-crystalline polymer is a polyethylene or polyethylene copolymer having a melt index greater than 5 g/10 min and a density greater than about 0.910 g/cc.

5. The method of claim 4 wherein step a), the semi-crystalline polymer is a polyethylene or polyethylene copolymer having a melt index greater than about 20 g/10 min.

6. The method of claim 4 wherein step a), the semi-crystalline polymer has a density of about 0.917 g/cc.

7. The method of claim 4 wherein step a), the semi-crystalline polymer has a density of greater than about 0.917 g/cc.

8. The method of claim 4 wherein step a), the semi-crystalline polymer has a density of between about 0.917 g/cc and 0.960 g/cc.

9. The method of claim 4 wherein step a), the semi-crystalline polymer has a density of between about 0.923 g/cc and 0.960 g/cc.

10. The method of claim 1, wherein step a), the semi-crystalline polymer is a polypropylene or polypropylene copolymer having a melt flow rate of greater than 10 g/10 min. and a density between about 0.89 g/c and 0.90 g/cc.

11. The method of claim 1 wherein step a), the filled polymer contains greater than 75 percent by weight filler.

12. The method of claim 1 wherein step b), the blended elastomeric composition contains between about 45 and 65 percent filler by weight.

13. The method of claim 1 wherein step b), the blended elastomeric composition contains between about 5 and 20 percent by weight semi-crystalline polymer.

14. The method of claim 1 wherein step b), the blended elastomeric composition contains between about 15 and 50 percent thermoplastic elastomer.

15. The method of claim 1 wherein step b), the blended elastomeric composition contains between about 25 and 50 percent thermoplastic elastomer.

16. The method of claim 1 wherein said bonding step e) is accomplished through a method selected from adhesive, thermal or ultrasonic bonding.

17. The method of claim 16 wherein said bonding Step e) is accomplished through an adhesive bonding step.

18. The method of claim 17 wherein said adhesive bonding step is accomplished by a slot coating adhesive system.

19. The method of claim 17, wherein adhesive is applied between about 1.0 and 3.0 gsm.

20. The method of claim 1, wherein said nonwoven layer is stretched in a CD direction prior to being bonded to said film layer.

21. The method of claim 20, wherein said nonwoven layer is stretched using grooved rolls.

22. The method of claim 20 wherein said nonwoven layer is necked to approximately its original width prior to being bonded to said film.

23. The method of claim 1, wherein said laminate demonstrates a load loss value of less than 75 percent, at 50 percent elongation, when stretched to 70 percent elongation.

24. The method of claim 1, wherein said laminate demonstrates a load loss value of less than 65 percent, at 50 percent elongation, when stretched to 70 percent elongation.

25. The method of claim 1, wherein said laminate demonstrates a load loss value of less than 60 percent, at 50 percent elongation, when stretched to 70 percent elongation.

26. The method of claim 1 wherein said thermoplastic elastomer is a block copolymer.

27. A method for forming en elastic, breathable film/nonwoven layer laminate comprising the steps of:
   a) filling a semi-crystalline, predominantly linear polymer with a filler to form a filled polymer such that said filled polymer contains at least 70 percent by weight filler, wherein said semi-crystalline polymer forms a shell around said filler particles;
   (b) dry-blending a thermoplastic elastomer with the filled polymer to form a blended elastomeric composition, such that said blended elastomer composition includes between about 25 and 70 percent filler by weight, between about 5 and 30 percent semi-crystalline polymer by weight, and between about 15 end 60 percent by weight elastomer;

c) extruding the blended elastomeric composition into a film, wherein said filled polymer is not fully compounded throughout said blended elastomeric composition;

d) stretching said film in a machine direction so that the film has a length from about 2 to about 5 times its original length, such that said film produced has a basis weight of between about 15 and 60 gsm and demonstrates a breathability greater than 100 g/m²/24 hours, e) bonding the produced film to a nonwoven layer to produce a film/nonwoven layer laminate demonstrating a load loss value of less than 75 percent at 50 percent elongation, when stretched to a 70 percent elongation.

28. The method of claim 27 wherein said thermoplastic elastomer is a block copolymer.

29. The method of claim 27 wherein said laminate load loss is less than about 65 percent.

30. The method of claim 27 wherein said laminate load loss is less than about 55 percent.

31. The method of claim 27 wherein step a), the semi-crystalline polymer is a polyethylene or polyethylene copolymer having a melt index greater than 10 g/10 min. and a density greater than 0.915 g/cc.

32. The method of claim 31 wherein step a), the semi-crystalline polymer is a polyethylene or polyethylene copolymer having a melt index greater than about 20 g/10 min.

33. The method of claim 31 wherein step a), the semi-crystalline polymer has a density of about 0.917 g/cc.

34. The method of claim 31 wherein step a), the semi-crystalline polymer has a density of greater than about 0.917 g/cc.

35. The method of claim 31 wherein step a), the semi-crystalline polymer has a density of between about 0.917 g/cc and 0.960 g/cc.

36. The method of claim 31 wherein step a), the semi-crystalline polymer has a density of between about 0.923 g/cc and 0.980 g/cc.

37. The method of claim 27, wherein step a), the semi-crystalline polymer is a polypropylene or polypropylene copolymer having a melt flow rate of greater than 20 g/10 min. and a density between about 0.69 g/c and 0.90 g/cc.

38. A method for forming an elastic, breathable film laminate comprises the steps of:

a) filling a semi-crystalline polymer with a filler to form a filled polymer such that the filled polymer contains at least 70 percent by weight filler, wherein said semi-crystalline polymer forms a shell around said filler particles;

b) dry-blending a thermoplastic elastomer with the filled polymer to form a blended elastomeric composition, such that the blended elastomeric composition includes between about 25 and 70 percent filler by weight, between about 5 and 30 percent semi-crystalline polymer by weight, and between about 15 and 60 percent by weight elastomer;

c) extruding the blended elastomer composition into a film, wherein said filled polymer is not fully compounded throughout said blended elastomeric composition;

d) stretching said film in a machine direction so that the film has a length that is from about 2 to about 5 times its original length, e) bonding the produced film to a nonwoven layer to produce a film layer/nonwoven layer laminate.

39. The method of claim 38 wherein said nonwoven layer is necked prior to bonding with the produced film.

40. The method of claim 38 wherein the nonwoven layer is stretched in the cross-machine direction and then necked down to its original width prior to being bonded to the film.

41. The method of claim 38 wherein the nonwoven layer is extensible.

42. The method of claim 1 wherein said nonwoven layer is necked prior to being bonded to said film.

43. The method of claim 27 wherein said nonwoven layer is necked prior to being bonded to said film.

* * * * *